(12) United States Patent
Seki et al.

(10) Patent No.: US 12,266,797 B2
(45) Date of Patent: Apr. 1, 2025

(54) SECONDARY BATTERY, BATTERY PACK, AND VEHICLE

(71) Applicant: KABUSHIKI KAISHA TOSHIBA, Tokyo (JP)

(72) Inventors: Hayato Seki, Kawasaki (JP); Takashi Kuboki, Tokyo (JP); Shinsuke Matsuno, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 474 days.

(21) Appl. No.: 17/650,547

(22) Filed: Feb. 10, 2022

(65) Prior Publication Data

US 2023/0024211 A1 Jan. 26, 2023

(30) Foreign Application Priority Data

Jul. 16, 2021 (JP) .................. 2021-117887

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/382* (2013.01); *H01M 4/505* (2013.01); *H01M 2004/027* (2013.01); *H01M 2004/028* (2013.01); *H01M 2220/20* (2013.01); *H01M 2300/0002* (2013.01); *H01M 2300/0094* (2013.01)

(58) Field of Classification Search
CPC ...... H01M 4/525; H01M 4/382; H01M 4/505; H01M 2004/027; H01M 2004/028; H01M 2220/20
See application file for complete search history.

(56) References Cited

U.S. PATENT DOCUMENTS 9,269,983 B2 * 2/2016 Lipka ................... H01M 8/188
10,559,854 B2 2/2020 Takami et al.
(Continued)

FOREIGN PATENT DOCUMENTS

JP 2009-110931 A 5/2009
JP 2018-92955 A 6/2018
(Continued)

OTHER PUBLICATIONS

Wang, Y. et al. "Hybrid Aqueous Energy Storage Cells Using Activated Carbon and Lithium-Ion Intercalated Compounds", Journal of the Electrochemical Society, vol. 154, No. 3, A228-A234, 2007.
(Continued)

*Primary Examiner* — Matthew J Merkling
(74) *Attorney, Agent, or Firm* — Oblon, McClelland, Maier & Neustadt, L.L.P.

(57) ABSTRACT

A secondary battery that includes: a positive electrode containing a positive electrode active material; a negative electrode; a separator arranged between the positive electrode and the negative electrode; and a first aqueous electrolyte held in at least the positive electrode. pH of the first aqueous electrolyte is more than 7. The positive electrode active material contains a lithium-containing compound that exhibits an average operating potential of less than 4.0 V based on lithium metal.

16 Claims, 7 Drawing Sheets

(51) Int. Cl.
*H01M 4/38* (2006.01)
*H01M 4/505* (2010.01)

(56) References Cited

U.S. PATENT DOCUMENTS

| | | | |
|---|---|---|---|
| 10,720,667 B2 | 7/2020 | Takami et al. | |
| 10,756,392 B2 | 8/2020 | Seki et al. | |
| 10,868,331 B2 | 12/2020 | Hotta et al. | |
| 2009/0087742 A1 | 4/2009 | Martinet et al. | |
| 2009/0226816 A1* | 9/2009 | Yoshida | C04B 35/447 264/610 |
| 2009/0286147 A1* | 11/2009 | Nakajima | H01M 50/406 427/80 |
| 2013/0141050 A1* | 6/2013 | Visco | H01M 8/188 429/535 |
| 2017/0077554 A1* | 3/2017 | Hayashi | H01M 4/30 |
| 2018/0048011 A1* | 2/2018 | Aziz | H01M 8/188 |
| 2018/0277899 A1* | 9/2018 | Takami | H01M 4/485 |
| 2020/0295334 A1 | 9/2020 | Seki et al. | |
| 2020/0295403 A1 | 9/2020 | Hotta et al. | |
| 2022/0045369 A1 | 2/2022 | Hiasa | |

FOREIGN PATENT DOCUMENTS

| | | | |
|---|---|---|---|
| JP | 2018-156895 A | 10/2018 | |
| JP | 2018-160342 A | 10/2018 | |
| JP | 2018-163893 A | 10/2018 | |
| JP | 2019-057373 A | 4/2019 | |
| JP | 2019-160748 A | 9/2019 | |
| JP | 2020-149875 A | 9/2020 | |
| JP | 2020-149930 A | 9/2020 | |
| WO | WO-2009108184 A1 * | 9/2009 | ............... G02F 1/25 |
| WO | WO-2015126379 A1 * | 8/2015 | .......... H01M 10/052 |
| WO | WO 2020/218456 A1 | 10/2020 | |

OTHER PUBLICATIONS

Japanese Office Action issued Jun. 11, 2024 in Japanese Application 2021-117887, (with unedited computer-generated English translation), 4 pages.

* cited by examiner

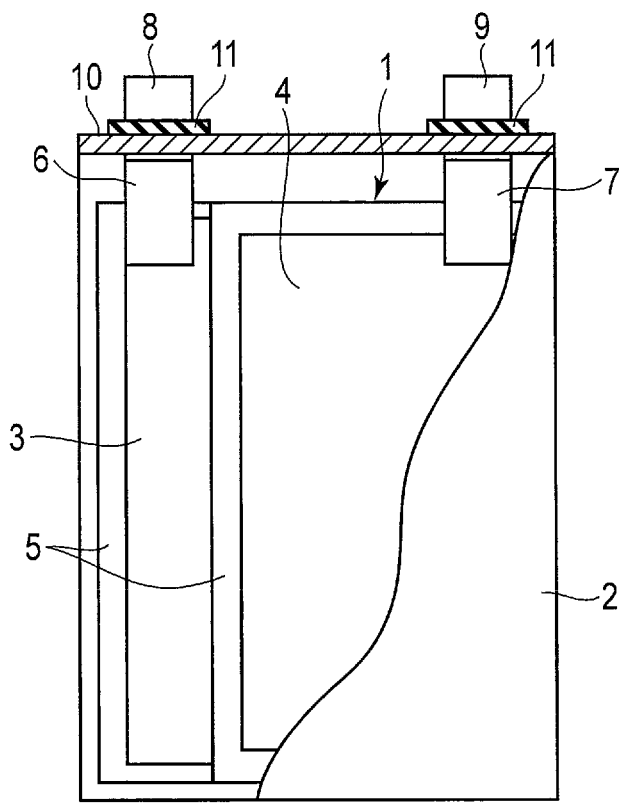
F I G. 1

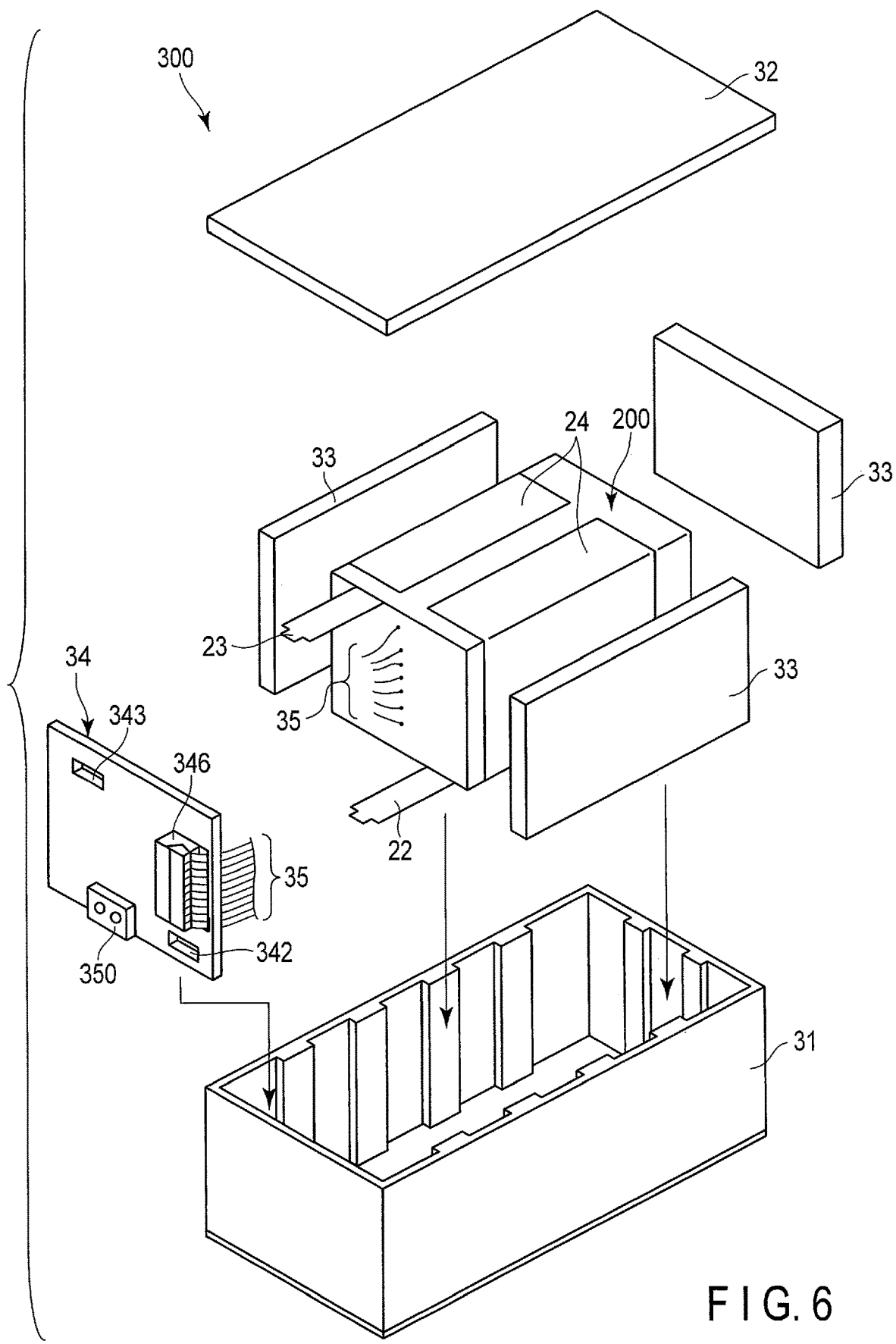
F I G. 6

SECONDARY BATTERY, BATTERY PACK, AND VEHICLE

CROSS-REFERENCE TO RELATED APPLICATIONS

This application is based upon and claims the benefit of priority from Japanese Patent Application No. 2021-117887, filed Jul. 16, 2021, the entire contents of which are incorporated herein by reference.

FIELD

Embodiments described herein relate generally to a secondary battery, a battery pack, and a vehicle.

BACKGROUND

A nonaqueous electrolyte battery formed by using a carbon material or a lithium titanium oxide as a negative electrode active material and a layered oxide that contains nickel, cobalt or manganese as a positive electrode active material, particularly a lithium secondary battery has already been in practical use as a power source in a wide range of fields. Such a nonaqueous electrolyte battery is provided in a variety of forms, such as small-sized batteries for various electronic devices and large-sized batteries for electric vehicles. As an electrolyte solution of the lithium secondary battery, a nonaqueous organic solvent prepared by mixing ethylene carbonate, methylethyl carbonate and the like is used, different from a nickel-hydrogen battery or a lead storage battery. An electrolyte solution prepared using the solvent has a high oxidation resistance and a high reduction resistant property compared to those of an aqueous electrolyte solution, whereby electrolysis of the solvent hardly occurs. Thus, in the case of a nonaqueous lithium secondary battery, a high electromotive force of from 2 V to 4.5 V is attained.

Meanwhile, many organic solvents are flammable substances. Accordingly, the safety of a secondary battery formed by using an organic solvent is theoretically inferior to that of a secondary battery formed by using an aqueous solution. In order to improve the safety of a lithium secondary battery formed by using an electrolyte solution containing an organic solvent, various countermeasures have been made, however it is not exactly sufficient. In the production process of the nonaqueous lithium secondary battery, a dry environment is necessary, thereby inevitably increasing the production cost. In addition, the electrolyte solution containing an organic solvent is inferior in electrical conductivity, whereby an internal resistance of the nonaqueous lithium secondary battery is easily increased. Such problems cause large defects of electric vehicles or hybrid electric vehicles and large-sized storage batteries for stationary energy storage, where emphasis is on the battery safety and cost.

In order to solve these problems, it has been examined to convert the electrolytic solution into an aqueous solution. Problems in the case of converting the electrolytic solution into an aqueous solution include that, in a positive electrode provided in a secondary battery using an aqueous electrolytic solution, a proton exchange reaction occurs between proton and lithium in a positive electrode active material. The proton exchange reaction is, for example, a reaction in which lithium in a crystal lattice is exchanged with protons, or protons occupy sites into which lithium ions in a crystal structure can be inserted. When the proton exchange reaction occurs by repetition of a charge-and-discharge cycle, there is a problem that the capacity of the secondary battery gradually decreases.

BRIEF DESCRIPTION OF THE DRAWINGS

FIG. 1 is a partially cutaway cross-sectional view schematically illustrating a secondary battery of an embodiment;
FIG. 6 is an exploded perspective view schematically illustrating an example of a battery pack according to the embodiment.

DETAILED DESCRIPTION

Figure 2:
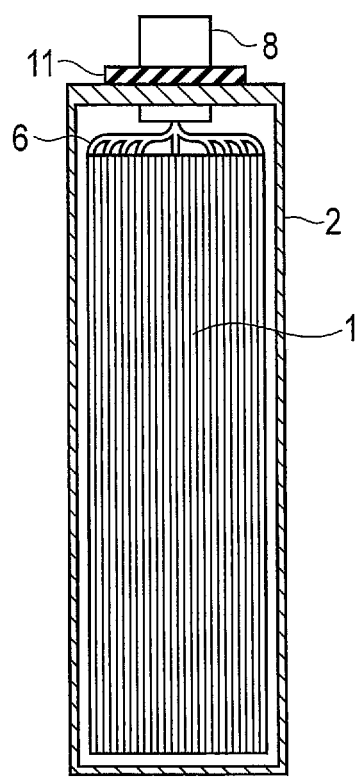
FIG. 2 is a side view of the secondary battery of FIG. 1.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

In accordance with a first embodiment, a secondary battery is provided. The secondary battery includes: a positive electrode containing a positive electrode active material; a negative electrode; a separator arranged between the positive electrode and the negative electrode; and a first aqueous electrolyte held in at least the positive electrode. pH of the first aqueous electrolyte is more than 7. The positive electrode active material contains a lithium-containing compound that exhibits an average operating potential of less than 4.0 V based on lithium metal.

When the aqueous electrolyte is used for the secondary battery, electrolysis of water can occur as a side reaction of the aqueous electrolyte. In the electrolysis of water, a chemical reaction shown in Formula (1) occurs in the negative electrode, and a chemical reaction shown in Formula (2) occurs in the positive electrode.

$$2H^+ + 2e^- \rightarrow H_2 \tag{1}$$

$$2H_2O \rightarrow O_2 + 4H^+ + 4e^- \tag{2}$$

Further, in oxidation-reduction reactions of the aqueous electrolyte, such as the electrolysis of water, there are: a potential window where decomposition due to the oxidation reaction does not occur; and a potential window where decomposition due to the reduction reaction does not occur.

For example, in the electrolysis of water, when a relationship shown in Formula (3) is established with regard to a potential E1 of the negative electrode from the Nernst equation, hydrogen is likely to be generated in the negative electrodes by the reduction reaction. When a relationship shown in Formula (4) is established with regard to a potential E2 of the positive electrode, oxygen is likely to be generated in the positive electrode by the oxidation reaction. Herein, pH in Formula (3) and Formula (4) exhibits pH of the aqueous electrolyte.

$$E1 < -0.059 \times pH \quad (3)$$

$$E2 > 1.23 - 0.059 \times pH \quad (4)$$

As seen from Formula (4), with regard to a positive electrode active material that exhibits a certain operating potential, the right side becomes larger as pH of the aqueous electrolyte in contact with the positive electrode is lower. Therefore, oxygen tends to be less likely to be generated. Meanwhile, since the right side becomes smaller as pH of the aqueous electrolyte in contact with the positive electrode is higher, oxygen tends to be likely to be generated.

Heretofore, in the secondary battery using the aqueous electrolyte, pH of the positive electrode-side aqueous electrolyte has been made acidic (that is, set to less than pH 7) from a viewpoint of suppressing the generation of oxygen. However, when pH of the positive electrode-side aqueous electrolyte is made acidic, proton exchange on the positive electrode is likely to occur since a proton concentration in the electrolyte is high. It has been being understood that, as a result, a capacity retention rate is likely to decrease by repeating a charge-and-discharge cycle. In the secondary battery according to the embodiment, pH of the positive electrode-side aqueous electrolyte is basic (that is, exceeding pH 7), and therefore, the proton exchange on the positive electrode is suppressed. In addition, the secondary battery according to the embodiment contains, as the positive electrode active material, the lithium-containing compound with an average operating potential of less than 4.0 V (vs. Li/Li$^+$). Therefore, the generation of oxygen is suppressed since the left side in Formula (4) described above is small. As a result, the secondary battery according to the embodiment can exhibit excellent cycle life characteristics.

The secondary battery according to the embodiment will be described below in detail.

In the secondary battery according to the embodiment, the positive electrode, the negative electrode and the separator can constitute an electrode group. The secondary battery can include a second aqueous electrolyte held in at least the negative electrode. The secondary battery may include the first aqueous electrolytes, which are identical to each other, as the positive electrode-side and negative electrode-side aqueous electrolytes. In other words, the secondary battery may include the first aqueous electrolyte as the positive electrode-side aqueous electrolyte, and may include the first aqueous electrolyte as the negative electrode-side aqueous electrolyte.

The secondary battery can further include a container member capable of housing the electrode group, the first aqueous electrolyte and the second aqueous electrolyte therein. Moreover, the secondary battery can further include negative electrode terminal electrically connected to the negative electrode and positive electrode terminal electrically connected to the positive electrode.

The positive electrode, the negative electrode, the first aqueous electrolyte, the second aqueous electrolyte, the separator and the container member will be described below in detail.

(1) Positive Electrode

The positive electrode may include a positive electrode current collector and a positive electrode active material-containing layer. The positive electrode active material-containing layer may be formed on one side or both sides of the positive electrode current collector. The positive electrode active material-containing layer may include a positive electrode active material, and optionally a conductive agent and a binder.

The positive electrode hold at least the first aqueous electrolyte. The first aqueous electrolyte is impregnated, for example, into a positive electrode active material-containing layer. The first aqueous electrolyte will be described later in detail.

The positive electrode active material contains a lithium-containing compound that exhibits an average operating potential of less than 4.0 V based on lithium metal. In this case, an oxygen evolution overpotential rises, and therefore, the generation of oxygen can be suppressed. The average operating potential of the lithium-containing compound contained in the positive electrode active material may be 3.9 V (vs. Li/Li$^+$) or less, may be 3.8 V or less, or may be 3.7 V or less. The generation of oxygen is suppressed when a positive electrode active material having a low average operating potential is used, and therefore, degradation of the positive electrode can be suppressed. That is, a high discharge capacity retention rate can be achieved. From a viewpoint of a battery capacity, the average operating potential of the lithium-containing compound contained in the positive electrode active material is desirably 3.5 V (vs. Li/Li$^+$) or more.

Examples of the lithium-containing compound that exhibits the average operating potential of less than 4.0 V based on lithium metal include a lithium nickel composite oxide (for example, $Li_xNiO_2$; $0<x\leq1$), a lithium cobalt composite oxide (for example, $Li_xCoO_2$; $0<x\leq1$), a lithium nickel cobalt composite oxide (for example, $Li_xNi_{1-y}Co_yO_2$; $0<x\leq1$, $0<y<1$), a lithium manganese cobalt composite oxide (for example, $Li_xMn_yCo_{1-y}O_2$; $0<x\leq1$, $0<y<1$), a lithium phosphorus oxide having an olivine structure (for example, $Li_xFePO_4$; $0<x\leq1$, $Li_xTi_2(PO_4)_3$; $0<x\leq1$, $Li_xFe_{1-y}Mn_yPO_4$; $0<x\leq1$, $0<y<1$, $Li_xCoPO_4$; $0<x\leq1$), a lithium nickel cobalt manganese composite oxide ($Li_xNi_{1-y-z}Co_yMn_zO2$; $0<x\leq1$, $0<y<1$, $0<z<1$, $y+z<1$), and a lithium vanadium phosphorus oxide (for example, $Li_xV_2(PO_4)$; $0<x<3$) Among them, preferably, the positive electrode active material contains the lithium nickel cobalt manganese composite oxide ($Li_xNi_{1-y-z}Co_yMn_zO_2$; $0<x\leq1$, $0<y<1$, $0<z<1$, $y+z<1$). The lithium nickel cobalt manganese composite oxide can maintain a high voltage without generating oxygen even under basic conditions. That is, the lithium nickel cobalt manganese composite oxide can achieve a high energy density. Further, proton exchange for the lithium nickel cobalt manganese composite oxide is suppressed easily under the basic conditions, and therefore, the lithium nickel cobalt manganese composite oxide can achieve an excellent capacity retention rate. Specific examples of the lithium nickel cobalt manganese composite oxide can include, for example, $LiNi_{0.5}Co_{0.2}Mn_{0.3}O_2$, $LiNi_{0.8}Co_{0.1}Mn_{0.1}O_2$, $LiNi_{0.6}Co_{0.2}Mn_{0.2}O_2$, and $LiNi_{0.333}Co_{0.333}Mn_{0.333}O_2$.

The positive electrode active material according to the embodiment may contain other active materials with an average operating potential of 4.0 V (vs. Li/Li$^+$) or more. A ratio of the other active materials in the positive electrode active material is preferably 20 mass % or less, may be 10 mass % or less, or may be 0 mass %. That is, the positive electrode active material may be formed of only the lithium-containing compound that exhibits an average operating potential of less than 4.0 V based on lithium metal.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably in the range of 0.1 m$^2$/g to 10 m$^2$/g. A positive electrode active material having the specific surface area of 0.1 m$^2$/g or more can adequately secure insertion/extraction sites of lithium ions. A positive electrode active material having the specific surface area of 10 m$^2$/g or less is easy to handle in industrial production and also can ensure charge-and-discharge cycle performance.

A binder is added in order to fill gaps of the dispersed positive electrode active material, or to bind the positive electrode active material and a positive electrode current collector to each other. Examples of the binder include polytetrafluoroethylene; PTFE, polyvinylidenefluoride; PVdF, fluorine-based rubber, a polyacrylic acid compound, an imide compound, carboxylmethylcellulose; CMC, and salt of CMC. One of these may be used as a binder, or alternatively, two or more thereof may be combined with each other and used as a binder.

The conductive agent is added to improve a current collection performance and to suppress the contact resistance between the positive electrode active material and the positive electrode current collector. Examples of the conductive agent include carbonaceous substances such as vapor grown carbon fiber (VGCF), carbon black such as acetylene black, and graphite. One of these may be used as the conductive agent, or two or more may be used in combination as the conductive agent. The conductive agent may be omitted.

In the positive electrode active material-containing layer, the positive electrode active material and binder are preferably blended in proportions of 80% by mass to 98% by mass, and 2% by mass to 20% by mass, respectively.

By setting the amount of the binder to 2% by mass or more, sufficient electrode strength can be obtained. The binder may also function as an insulator. Thus, if the amount of the binder to 20% by mass or less, the amount of insulator contained in the electrode decreases, and thereby internal resistance can be decreased.

When a conductive agent is added, the positive electrode active material, the binder, and the conductive agent are preferably blended in proportions of 77% by mass to 95% by mass, 2% by mass to 20% by mass, and 3% by mass to 15% by mass, respectively.

By setting the amount of the conductive agent to 3% by mass or more, the above effect can be expressed. Also, by setting the amount of the conductive agent to 15% by mass or less, the ratio of the conductive agent in contact with the electrolyte can be reduced. When this ratio is low, decomposition of the electrolyte can be reduced during storage under high temperatures.

Preferably, the positive electrode current collector is foil of metal such as titanium, aluminum and stainless steel, or aluminum alloy foil containing one or more elements selected from Mg, Ti, Zn, Ni, Cr, Mn, Fe, Cu and Si. In order to prevent corrosion of the current collector due to a reaction of the current collector and the electrolyte, the surface of the current collector may be coated with a different type of element.

The thickness of the positive electrode current collector is preferably in the range of 5 μm to 20 μm and more preferably 15 μm or less.

Also, the positive electrode current collector may include a part on the surface where no positive electrode active material-containing layer is formed. The part can act as a positive electrode tab.

The positive electrode is produced by, for example, the following method. First, a positive electrode active material, a conductive agent, and a binder are suspended in a solvent to prepare a slurry. The slurry is applied to one side or both sides of a positive electrode current collector. Next, the applied slurry is dried to obtain a laminated body of the positive electrode active material-containing layer and the positive electrode current collector. Then, the laminated body is pressed. In this manner, a positive electrode is produced.

Alternatively, the positive electrode may be produced by the following method. First, a positive electrode active material, a conductive agent, and a binder are mixed to obtain a mixture. Subsequently, the mixture is formed in pellets. Subsequently, a positive electrode can be obtained by placing the pellets on a positive electrode current collector.

(2) Negative Electrode

The negative electrode includes the negative electrode current collector and the negative electrode active material-containing layer supported on one surface or both surfaces of the negative electrode current collector. The negative electrode active material-containing layer contains a negative electrode active material. The negative electrode active material-containing layer is disposed on at least one surface of the negative electrode current collector. For example, the negative electrode active material-containing layer may be disposed on one of the surfaces of the negative electrode current collector, and the negative electrode active material-containing layers may be arranged on one of the surfaces of the negative electrode current collector and the back surface thereof.

As the material of the negative electrode current collector, a substance that is electrochemically stable in the negative electrode potential range when the alkali metal ions are inserted or extracted is used. The negative electrode current collector is preferably, for example, an aluminum foil or an aluminum alloy foil containing at least one element selected from the group consisting of magnesium (Mg), titanium (Ti), zinc (Zn), manganese (Mn) iron (Fe), copper (Cu), and silicon (Si). The negative electrode current collector may have another form such as a porous body or a mesh. The thickness of the negative electrode current collector is preferably 5 μm o 50 μm. A current collector having such a thickness can balance the strength of the electrode and weight reduction.

The negative electrode current collector may include a portion where the negative electrode active material-containing layer is not formed on a surface of the negative electrode current collector. This portion can serve as a negative electrode tab.

The porosity of the negative electrode active material-containing layer is preferably set to 20% to 50%. This makes it possible to obtain a negative electrode having good affinity for the aqueous electrolyte and having a high density. The porosity of the negative electrode active material-containing layer is more preferably 25% to 40%.

The porosity of the negative electrode active material-containing layer can be obtained by, for example, mercury porosimetry. More specifically, first, the pore distribution of the active material-containing layer is obtained by mercury porosimetry. Next, the total pore amount is calculated from the pore distribution. Next, the porosity can be calculated from the ratio of the total pore amount and the volume of the active material-containing layer.

As the negative electrode active material, a compound whose lithium ion insertion/extraction potential is 1 V (vs. Li/Li$^+$) to 3 V (vs. Li/Li$^+$) as a potential based on metal lithium can be used. That is, the secondary battery according to the first embodiment can maintain the hydrogen generation potential of the negative electrode in a low state after the initial charge, as described above. Hence, a material whose lithium ion insertion/extraction potential has a relatively small lower limit value can be used as the negative electrode active material of the secondary battery. When such a negative electrode active material is used, the energy density of the secondary battery can be raised. For this reason, the secondary battery can implement the same energy density as that of a battery using a nonaqueous electrolyte.

As the negative electrode active material, more specifically, a titanium oxide or a titanium-containing oxide can be used. As the titanium-containing oxide, a lithium titanium composite oxide, a niobium titanium composite oxide, a sodium niobium titanium composite oxide and the like can be used. One type or two or more types of the titanium oxide and the titanium-containing oxide can be included in the negative electrode active material.

The titanium oxide includes, for example, a titanium oxide having a monoclinic structure, a titanium oxide having a rutile structure, and a titanium oxide having an anatase structure. For titanium oxides of these crystal structures, the composition before charge can be expressed as $TiO_2$, and the composition after charge can be expressed as $Li_xTiO_2$ ($0 \leq x \leq 1$). In addition, the structure of titanium oxide having a monoclinic structure before charge can be expressed as $TiO_2(B)$.

The lithium titanium composite oxide includes, for example, a lithium titanium composite oxide having a spinel structure (for example, the general formula is $Li_{4+x}Ti_5O_{12}$ ($-1 \leq x \leq 3$)), a lithium titanium composite oxide having a ramsdellite structure (for example, $Li_{2+x}Ti_3O_7$ ($-1 \leq x \leq 3$)), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$), and the like. The lithium titanium composite oxide may be a lithium titanium composite oxide in which a dopant is introduced.

The niobium titanium composite oxides include, for example, a material expressed as $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, M is at least one element selected from the group consisting of Fe, V, Mo, and Ta).

The sodium titanium oxides include, for example, an orthorhombic Na-containing niobium titanium composite oxide represented by the general formula $Li_{2+v}Na_{2-w}M1_xTi_{6-y-z}Nb_yM2_zO_{14+\delta}$ ($0 \leq v \leq 4$, $0 \leq w < 2$, $0 \leq x < 2$, $0 \leq y < 6$, $0 \leq z < 3$, $-0.5 \leq \delta \leq 0.5$, M1 includes at least one element selected from the group consisting of Cs, K, Sr, Ba, and Ca, and M2 includes at least one element selected from the group consisting of Zr, Sn, V, Ta, Mo, W, Fe, Co, Mn, and Al).

As the negative electrode active material, the titanium oxide having the anatase structure, the titanium oxide having the monoclinic structure, the lithium titanium composite oxide having the spinel structure, or a mixture thereof is preferably used. When one of these oxides is used as the negative electrode active material and a lithium manganese composite oxide is used as the positive electrode active material, a high electromotive force can be obtained.

The negative electrode active material is contained in the negative electrode active material-containing layer in a form of, for example, particles. The negative electrode active material particles can be primary particles, secondary particles as the aggregates of primary particles, or a mixture of single primary particles and secondary particles. The shape of a particle is not particularly limited and can be, for example, spherical, elliptical, flat, or fibrous.

An average particle size (diameter) of primary particles of the negative electrode active material is preferably 3 μm or less and more preferably 0.01 μm or more and 1 μm or less. An average particle size (diameter) of secondary particles of the negative electrode active material is preferably 30 μm or less and more preferably 5 μm or more and 20 μm or less.

Each of the primary particle size and the secondary particle size means a particle size with which a volume integrated value becomes 50% in a particle size distribution obtained by a laser diffraction particle size distribution measuring apparatus. As the laser diffraction particle size distribution measuring apparatus, Shimadzu SALD-300 is used, for example. For measurement, luminous intensity distribution is measured 64 times at intervals of 2 seconds. As a sample used when performing the particle size distribution measurement, a dispersion obtained by diluting the negative electrode active material particles by N-methyl-2-pyrrolidone such that the concentration becomes 0.1 wt- to 1 wt % is used. Alternatively, a measurement sample obtained by dispersing 0.1 g of a negative electrode active material in 1 to 2 ml of distilled water containing a surfactant is used.

In addition to the negative electrode active material, the negative electrode active material-containing layer may contain a conductive agent, a binder, and the like. A conductive agent is added as necessary in order to increase the current-collecting performance and to suppress the contact resistance between the active material and the current collector. The binder has an function of binding the active material, the conductive agent, and the current collector.

Examples of the conductive agent include carbonaceous materials such as acetylene black, Ketjen black, graphite, and coke. The conductive agent may be of one type, or two or more types may be used in mixture.

A binder is added in order to fill gaps of a dispersed active material, or to bind the active material and a negative electrode current collector to each other. Examples of the binder include polytetrafluoroethylene; PTFE, polyvinylidenefluoride; PVdF, fluorine-based rubber, styrene-butadiene rubber, a polyacrylic acid compound, an imide compound, carboxylmethylcellulose; CMC, and salt of CMC. One of these may be used as a binder, or alternatively, two or more thereof may be combined with each other and used as a binder.

The mixing ratios of the conductive agent and the binder in the negative electrode active material-containing layer are preferably in a range of 1 part by weight or more and 20 parts by weight or less, and in a range of 0.1 part by weight or more and 10 parts by weight or less, respectively, with respect to 100 parts by weight of the active material. If the mixing ratio of the conductive agent is 1 part by weight or more, the conductivity of the negative electrode can be improved. If the mixing ratio of the conductive agent is 20 parts by weight or less, decomposition of the aqueous electrolyte on the conductive agent surface can be reduced. When the mixing ratio of the binder is 0.1 part by weight or more, sufficient electrode strength is obtained, and when the mixing ratio of the binder is 10 parts by weight or less, an insulating portion of the electrode can be decreased.

The negative electrode can be obtained by, for example, the following method. First, the active material, the conductive agent, and the binder are suspended in an appropriate solvent to prepare a slurry. Next, the slurry is applied to one surface or both surfaces of the current collector. The coating on the current collector is dried, thereby forming an active material-containing layer. After that, pressing is performed for the current collector and the active material-containing layer formed on it. As the active material-containing layer, the mixture of the active material, the conductive agent, and the binder formed into pellets may be used.

Crystal structures and element compositions of the positive electrode active material and the negative electrode active material can be confirmed, for example, by powder X-ray diffraction (XRD) measurement and inductively coupled plasma (ICP) emission spectroscopy, which will be described below.

<Powder X-ray Diffraction Measurement of Active Materials>

The powder X-ray diffraction measurement of the active material can be performed, for example, as follows.

First, the target sample is ground until an average particle size reaches about 5 μm. A holder part, which has a depth of 0.2 mm and is formed on a glass sample plate, is filled with the ground sample. At this time, care should be taken to fill the holder part sufficiently with the sample. In addition, Precaution should be taken to perform the filling with the amount of the sample neither being excessive nor insufficient such that cracks, voids, and the like do not occur. Next, another glass plate is pushed from the outside to flatten a surface of the sample filling the holder part. Precaution should be taken not to cause a recess or a protrusion from a reference plane of the holder due to an excessive or insufficient amount of filling.

Next, the glass plate filled with the sample is set in a powder X-ray diffractometer, and a diffraction pattern (X-Ray diffraction pattern (XRD pattern)) is obtained using Cu-Kα rays.

Incidentally, there is a case where the orientation of the sample increases depending on a particle shape of the sample. In the case where there is high degree of orientation in the sample, there is the possibility of deviation of the peak or variation in an intensity ratio, depending on the filling state of the sample. The sample whose orientation is remarkably high in this manner is measured using a glass capillary. Specifically, a sample is inserted into a capillary, and this capillary is placed on a rotary sample stage and measured. It is possible to alleviate the orientation with the above-described measuring method. It is preferable to use a capillary formed of Lindeman glass having a diameter of 1 mm to 6 mmφ as the glass capillary.

In the case of performing the powder X-ray diffraction measurement for the active material included in a secondary battery or an electrode, the powder X-ray diffraction measurement can be performed, for example, as follows.

First, in order to grasp the crystal state of the active material, lithium ions are fully released from the active material. For example, when the active material is used in the negative electrode, the battery is brought into a fully discharged state. The battery can be brought into the discharged state by, for example, repeating the discharge of the battery at 0.1 C current at 25° C. until a rated end voltage or a battery voltage reaches 1.0 V a plurality of times, so that the current value at the time of discharge becomes 1/100 or less of the rated capacity. There may be lithium ions remaining even in the discharged state.

Next, the battery is disassembled in a glove box filled with argon, and the electrode is taken out and washed with an appropriate solvent. As an appropriate solvent, for example, ethyl methyl carbonate can be used. When the cleaning of the electrode is insufficient, an impurity phase such as lithium carbonate and lithium fluoride may be mixed due to the influence of lithium ions remaining in the electrode. In that case, an airtight container capable of performing measurement atmosphere in an inert gas may be used. At this time, peaks derived from metal foil which is the current collector, the conductive agent, the binder, and the like are measured in advance by using EDX and grasped. Naturally, when you have been able to grasp these in advance, this operation can be omitted. When the peak of the current collector and the peak of the active material overlap, it is desirable to perform measurement by peeling the active material-containing layer off the current collector. This is for separating the overlapping peaks at the time of quantitatively measuring peak intensity. The active material-containing layer may be physically peeled. The active material-containing layer tends to be peeled when an ultrasonic wave is applied to the active material-containing layer in an appropriate solvent. When ultrasonic treatment is performed to peel the active material-containing layer off the current collector, an electrode body powder (including the active material, the conductive agent, and the binder) can be recovered by volatilizing the solvent.

Collected electrode material powder is subjected to the measurement by being loaded, for example, into a capillary made of Lindeman glass, whereby the powder X-ray diffraction measurement for the active material can be performed. Note that the electrode material powder collected by performing ultrasonic treatment can also be served for a variety of analyses other than the powder X-ray diffraction measurement.

<ICP Emission Spectroscopy>

The composition of the active material can be analyzed using, for example, inductively coupled plasma (ICP) emission spectroscopy. At this time, an abundance ratio (molar ratio) of each element depends on sensitivity of an analyzer to be used. Hence the measured molar ratio may deviate from an actual molar ratio by an error of the measuring device. However, even when the numerical value deviates from the error range of the analyzer, the performance of the active material according to the embodiment can be exhibited sufficiently.

For measuring the composition of the active material incorporated in the battery by the ICP emission spectroscopy, specifically, the following procedure is performed.

First, the electrode containing the active material to be measured is taken out from the secondary battery by the procedure described in the section of the powder X-ray diffraction measurement, and then washed. From the washed electrode, the portion containing the electrode active material such as the active material-containing layer is peeled. The portion containing the electrode active material can be peeled by, for example, irradiating the portion with ultrasonic waves. As a specific example, for example, by placing the electrode in ethyl methyl carbonate placed in a glass beaker and vibrating the electrode in an ultrasonic washer, it is possible to peel the active material-containing layer containing the electrode active material off the electrode current collector.

Next, the peeled portion is heated in an atmosphere for a short time (e.g., at 500° C. for about 1 hour) to burn off unnecessary components such as the binder component and carbon. By dissolving this residue with acid, a liquid sample containing an active material can be prepared. At this time, hydrochloric acid, nitric acid, sulfuric acid, hydrogen fluoride, and the like can be used as the acid. The composition in the active material can be seen by subjecting this liquid sample to TCP analysis.

<Measurement of Average Operating Potential of Positive Electrode Active Material>

The secondary battery is disassembled, and the positive electrode is taken out. The positive electrode thus taken out is rinsed three times by pure water, and thereafter, is vacuum dried at 120° C. for 12 hours or more. Thereafter, when the positive electrode active material-containing layers are formed on both surfaces of this positive electrode, the layer on one of the surfaces is peeled by NMP, and a single-sided electrode is produced. The single-sided electrode is produced under a dry environment at a dew point of −20° C. or less. The electrode thus obtained is used as a positive electrode, Li is used as a counter electrode, and a coin cell is produced. For example, a glass filter can be used for a separator. For an electrolytic solution, an electrolytic solution is used, which is formed by dissolving $LiPF_6$ at a concentration of 1 mol/L into a solvent obtained by mixing ethylene carbonate and diethyl carbonate with each other in a volume ratio of 1:2.

For Li as the counter electrode, constant current charge is performed up to 4 V, and thereafter, constant current discharge is performed to 3 V, whereby a charge-and-discharge curve is obtained. A capacity per active material amount is set as mAh/g, and an average value of a charge voltage and a discharge voltage at the time of 50 mAh/g is defined as the operating potential of the positive electrode active material. Note that, in order to determine the capacity per active material amount, it is necessary to obtain an active material weight per unit weight of the electrode. Rietveld analysis is performed by using results of the XRD measurement for the electrode to calculate a weight ratio of the active material contained in the electrode, whereby the active material weight per unit weight of the electrode can be obtained.

(3) First Aqueous Electrolyte

The first aqueous electrolyte is held in at least the positive electrode. The first aqueous electrolyte can be held in not only the positive electrode but also at least either the negative electrode or the separator. The aqueous electrolyte provided in the secondary battery may be only one type that is the first aqueous electrolyte. That is, the first aqueous electrolyte may be held in all of the positive electrode, the negative electrode and the separator.

For example, the first aqueous electrolyte can be a liquid aqueous electrolyte containing an aqueous solvent and lithium salt as electrolyte salt. The first aqueous electrolyte may be a gel aqueous electrolyte formed by compositing the liquid aqueous electrolyte and a first polymer material with each other. Examples of the first polymer material can include polyvinylidenefluoride (PVdF), polyacrylonitrile (PAN), polyethylene oxide (PEO), and the like. A content of the first polymer material in the first aqueous electrolyte ranges, for example, from 0.5 weight % or more to 10 weight % or less.

The aqueous solvent is a solvent containing water, and can be formed of water alone or of water and a solvent other than water. Examples of the solvent other than water include a water-soluble organic solvent. Examples of the water-soluble organic solvent include γ-butyrolactone, acetonitrile, alcohols, N-methylpyrrolidone (NMP), dimethylacetamide, dimethylsulfoxide, and tetrahydrofuran. A type of the solvent contained in the aqueous solvent of the first aqueous electrolyte can be one type or two or more types. In the aqueous solvent of the first aqueous electrolyte, a content of the solvent other than water is desirably set to 20 weight % or less.

The pH value of the first aqueous electrolyte is larger than 7.0. That is, the first aqueous electrolyte is basic. Since the pH of the first aqueous electrolyte is higher than 7, the proton exchange can be suppressed from occurring in the positive electrode. As a result, even if the charge-and-discharge cycle is repeated, for example, lithium ion sites present in the positive electrode active material are less likely to be occupied by protons, and a high discharge capacity is maintained with ease. The pH of the first aqueous electrolyte is preferably 8.0 or more, more preferably 13.0 or more.

The pH value of the first aqueous electrolyte may be the same as or different from a pH value of a second aqueous electrolyte to be described later. When both of the pH value of the first aqueous electrolyte and the pH value of the second aqueous electrolyte are basic, a suppression effect of the proton exchange is obtained in the positive electrode, and a suppression effect of the hydrogen generation is obtained in the negative electrode.

Therefore, excellent cycle life characteristics can be achieved. In the secondary battery according to the embodiment, both of the pH value of the first aqueous electrolyte and the pH value of the second aqueous electrolyte are preferably 8.0 or higher, and both thereof are more preferably 13.0 or higher.

Note that the pH values of the aqueous electrolytes mean pH values at 25° C. in the specification of the present application and the scope of claims.

The pH of the first aqueous electrolyte can be adjusted, for example, by a reagent such as HCl, $H_2SO_4$, LiOH, NaOH, KOH, and a tetraethylamine hydroxide solution.

The first aqueous electrolyte is prepared, for example, by dissolving electrolyte salt into the aqueous solvent at a concentration of 1 to 14 mol/L. A concentration of the lithium ions in the aqueous electrolyte is preferably 6 M (mol/L) or more. In this case, ion conductivity of the electrolytic solution is improved, and an output of the battery increases. Further, when the concentration of the lithium salt is increased, the coordination number of lithium atoms per water molecule increases. Therefore, a coordination structure is stabilized, and an electrolysis reaction of water is suppressed, leading to improvement of coulombic efficiency and cycle characteristics. A more preferable concentration ranges from 6 M to 14 M.

Examples of the lithium salt include LiCl, LiBr, LiOH, $Li_2SO_4$, $LiNO_3$, $LiN(SO_2CF_3)_2$ (LiTFSI: lithium bis(trifluoromethanesulfonyl)imide), $LiN(SO_2F)_2$ (LiFSI: lithium-bis(fluorosulfonyl)imide), and $LiB[(OCO)_2]_2$ (LiBOB: lithium bisoxalateborate). A type of the lithium salt for use may be one type or two or more types. Further, the aqueous electrolyte may contain salt other than the lithium salt. Examples of the salt other than the lithium salt can include $ZnSO_4$.

The first aqueous electrolyte may further contain sodium salt. Examples of the sodium salt include NaCl, $Na_2SO_4$, NaOH, $NaNO_3$ and sodium trifluoromethanesulfonylamide (NaTFSA). A type of the sodium salt for use may be one type or two or more types.

(4) Second Aqueous Electrolyte

When the secondary battery includes the second aqueous electrolyte, the second aqueous electrolyte is held in at least the negative electrode. The second aqueous electrolyte can be held in not only the negative electrode but also at least either the positive electrode or the separator.

For example, the second aqueous electrolyte can be a liquid aqueous electrolyte containing an aqueous solvent and lithium salt as electrolyte salt. The second aqueous electrolyte may be a gel aqueous electrolyte formed by compositing the liquid aqueous electrolyte and a second polymer material with each other. Examples of the second polymer material can include polyvinylidenefluoride (PVdF), polyacrylonitrile (PAN), polyethylene oxide (PEO), and the like. A content of the second polymer material in the second aqueous electrolyte ranges, for example, from 0.5 weight % or more to 10 weight % or less.

The aqueous solvent is a solvent containing water, and can be formed of water alone or of water and a solvent other than water. Examples of the solvent other than water include a water-soluble organic solvent. Examples of the water-soluble organic solvent include γ-butyrolactone, acetonitrile, alcohols, N-methylpyrrolidone (NMP), dimethylacetamide, dimethylsulfoxide, and tetrahydrofuran. A type of the solvent contained in the aqueous solvent of the second aqueous electrolyte can be one type or two or more types. In the aqueous solvent of the second aqueous electrolyte, a content of the solvent other than water is desirably set to 20 weight % or less.

A pH value of the second aqueous electrolyte is not particularly limited; however, is preferably larger than 7.0. That is, the second aqueous electrolyte is preferably basic. When the pH of the second aqueous electrolyte exceeds 7.0, a hydrogen evolution overpotential in the negative electrodes rises, and therefore, the generation of hydrogen is suppressed. Therefore, charge-and-discharge efficiency in the negative electrodes increases. As a result, in the secondary battery, a high discharge capacity is obtained, and in addition, storage performance (self-discharge performance) and cycle life performance of the secondary battery are improved. The pH of the second aqueous electrolyte is preferably 8.0 or more, more preferably 13.0 or more.

The pH of the second aqueous electrolyte can be adjusted, for example, by a reagent such as HCl, $H_2SO_4$, LiOH, NaOH, KOH, and a tetraethylamine hydroxide solution.

The second aqueous electrolyte is prepared, for example, by dissolving electrolyte salt into the aqueous solvent at a concentration of 1 to 14 mol/L. A concentration of the lithium ions in the aqueous electrolyte is preferably 6 M (mol/L) or more. Thus, the electrolysis of water in the negative electrode is suppressed, and the generation of hydrogen from the negative electrode can be reduced. A more preferable concentration ranges from 6 M to 14 M.

Examples of the lithium salt include LiCl, LiBr, LiOH, $Li_2SO_4$, $LiNO_3$, $LiN(SO_2CF_3)_2$ (LiTFSI: lithium bis(trifluoromethanesulfonyl)imide), $LiN(SO_2F)_2$ (LiFST: lithium-bis(fluorosulfonyl)imide), and $LiB[(OCO)_2]_2$ (LiBOB: lithium bisoxalateborate). A type of the lithium salt for use may be one type or two or more types. Further, the aqueous electrolyte may contain salt other than the lithium salt. Examples of the salt other than the lithium salt can include $ZnSO_4$.

The second aqueous electrolyte may further contain sodium salt. Examples of the sodium salt include NaCl, $Na_2SO_4$, NaOH, $NaNO_3$ and sodium trifluoromethanesulfonylamide (NaTFSA). A type of the sodium salt for use may be one type or two or more types.

In each of the first aqueous electrolyte and the second aqueous electrolyte, an amount of the aqueous solvent is preferably 1 mol or more with respect to 1 mol of salt serving as a solute. A more preferable mode is that the amount of aqueous solvent with respect to 1 mol of the salt serving as a solute is 3.5 mol or more.

Whether or not water is contained in each of the first aqueous electrolyte and the second aqueous electrolyte can be confirmed by gas chromatography-mass spectrometry (GC-MS) measurement. Further, such a salt concentration and a water content in each of the aqueous electrolytes can be measured, for example, by inductively coupled plasma (ICP) emission spectrometry or the like. The aqueous electrolyte is weighed by a prescribed amount, and the concentration of salt contained therein is calculated, whereby a mol concentration (mol/L) can be calculated. Further, a specific gravity of the aqueous electrolyte is measured, whereby the number of moles of each of the solute and the solvent can be calculated.

<Measurement of pH of Aqueous Electrolyte>

A method for measuring the pH of each of the first aqueous electrolyte and the second aqueous electrolyte is as follows.

After the secondary battery is discharged, the battery is disassembled, and the electrode group is taken out. Each of the aqueous electrolytes (electrolytic solutions) in the positive electrode and the negative electrode is extracted, and a liquid volume is measured, and thereafter, the pH value is measured by a pH meter. The measurement of the pH value is performed as follows, for example, under an environment of 25° C. For this measurement, for example, F-74 made by Horiba Ltd. is used. First, standard solutions with pH 4.0, 7.0 and 9.0 are prepared. Next, calibration of the F-74 is performed by using these standard solutions. An electrolyte (electrolytic solution) as a measurement target, of which amount is appropriately adjusted, is put into a container and pH thereof is measured. After the pH is measured, a sensor unit of the F-74 is cleaned. At the time of measuring another measurement target, the above-mentioned procedure, that is, the calibration, the measurement and the cleaning are implemented every time.

Note that the pH value of each of the aqueous electrolytes does not change whether the pH value is measured after the battery is disassembled or whether the pH value is measured whether the aqueous electrolyte is prepared. The pH can fluctuate locally (in the very vicinities of the positive electrodes or the negative electrodes) by the charge and the discharge. However, the pH does not fluctuate in the whole of the aqueous electrolyte, for example, in the whole of the first aqueous electrolyte, or in the whole of the second aqueous electrolyte.

(5) Separator

The separator can be arranged between the positive electrode and the negative electrode. The separator is interposed, for example, in at least a part of a facing portion of the positive electrode and the negative electrode. The separator is formed of an insulating material, and can thereby prevent electrical contact of the positive electrode and the negative electrode. Examples of the separator include a solid electrolyte membrane, a ceramic membrane, and a porous sheet. As the separator, these may be used alone, or a stack of at least two of these may be used. Examples of the porous sheet include, nonwoven fabric, film, and paper. For example, the separator can be a composite solid electrolyte membrane in which the solid electrolyte membrane is provided on at least one main surface of the porous sheet. The composite solid electrolyte membrane preferably includes a solid electrolyte membrane containing a solid electrolyte that has lithium ion conductivity of $1\times10^{-10}$ S/cm or more at 25° C., and a porous sheet in which a permeability coefficient ranges from $1\times10^{-19}$ $m^2$ or more to less than $1\times10^{-15}$ $m^2$. Note that the permeability coefficient of the separator is not particularly limited; however, preferably ranges from $1\times10^{-19}$ m$^2$ or more to less than $1\times10^{-15}$ m$^2$.

The solid electrolyte membrane can contain solid electrolyte particles and a polymer material (third polymer material). The solid electrolyte membrane may be formed of only the solid electrolyte particles. The solid electrolyte membrane may contain one type of the solid electrolyte particles, or may contain a plurality of types of the solid electrolyte particles. The solid electrolyte membrane may contain at least one selected from the group consisting of plasticizers and electrolyte salts. When the solid electrolyte membrane contains electrolyte salt, for example, alkali metal ion conductivity of the solid electrolyte membrane can be further increased. Note that the form of the polymer material can be, for example, particulate or fibrous.

The lithium ion conductivity of the solid electrolyte membrane is, for example, $2\times10^{-14}$ S/cm or more at 25° C. The lithium ion conductivity of the solid electrolyte membrane at 25° C. is preferably $1\times10^{-10}$ S/cm or more, and more preferably $1\times10^{-7}$ S/cm or more. When the lithium ion conductivity of the solid electrolyte membrane is less than $2\times10^{-14}$ S/cm, the charge-and-discharge efficiency of the secondary battery may decrease.

The solid electrolyte membrane is preferably a plate-like one with little or none of pores such as pinholes. A thickness of the solid electrolyte membrane is not particularly limited; however, 150 μm or less for example, and preferably ranges from 20 μm or more to 50 μm or less.

The solid electrolyte membrane has lithium ion conductivity. A permeability coefficient of the solid electrolyte membrane is not particularly limited; however, for example, $1\times10^{-19}$ m$^2$ or more and 0 or less. The permeability coefficient of the solid electrolyte membrane may be 0. The permeability coefficient of the solid electrolyte membrane preferably ranges from $1\times10^{-19}$ m$^2$ or more to less than $1\times10^{-15}$ m$^2$. In this case, temporal thermodynamic mixing of the first aqueous electrolyte and the second aqueous electrolyte can be suppressed kinetically. Even if the electrolyte with the same pH is used for both of the first aqueous electrolyte and the second aqueous electrolyte, a side reaction occurs, for example, until a charge and a discharge in a twentieth cycle. By this side reaction, in a local portion between the separator and the electrode, the first aqueous electrolyte becomes acidic, and becomes an electrolyte resistant to oxidation. Meanwhile, the second aqueous electrolyte becomes basic, and becomes an electrolyte resistant to reduction. In the above-described permeability coefficient, it is possible to maintain such local changes of the pH, and therefore, the oxidation reaction of the first aqueous electrolyte and the reduction reaction of the second aqueous electrolyte can be suppressed, and the coulombic efficiency and the cycle characteristics can be improved.

Further, different electrolytes may be used between the positive electrode side and the negative electrode side. Specifically, for example, the first aqueous electrolyte resistant to the oxidation can be used on the positive electrode side, and the second aqueous electrolyte resistant to the reduction can be used on the negative electrode side. Also in this case, the oxidation reaction of the first aqueous electrolyte and the reduction reaction of the second aqueous electrolyte can be suppressed, and therefore, excellent coulombic efficiency and cycle characteristics can be achieved.

The ceramic membrane may have or do not have to have lithium ion conductivity. The lithium ion conductivity of the ceramic membrane is, for example, less than $2\times10^{-14}$ S/cm at 25° C.

A permeability coefficient of the ceramic membrane is, for example, $1\times10^{-19}$ m$^2$ or more and 0 or less. The permeability coefficient of the ceramic membrane may be 0. Examples of a material that constitutes the ceramic membrane include zinc oxide (for example, ZnO and ZnO$_2$), alumina (for example, Al$_2$O$_3$), zirconia (for example, ZrO$_2$) boron oxide (for example, B$_2$O$_3$), and titanium oxide (for example, TiO and TiO$_2$). Like the solid electrolyte membrane, the ceramic membrane may contain a polymer material (third polymer material).

Examples of the constituent material of the porous sheet formed of nonwoven fabric, film and paper include polyolefin such as polyethylene and polypropylene, and include cellulose. Examples of a preferable porous sheet can include nonwoven fabric containing cellulose fiber and a porous film containing polyolefin fiber.

A permeability coefficient of the porous sheet is preferably $1\times10^{-19}$ m$^2$ or more and less than $1\times10^{-15}$ m$^2$. When the permeability coefficient of the porous sheet is $1\times10^{-19}$ m$^2$ or more, the electrolyte is easily impregnated into the porous sheet. Therefore, the lithium ion conductivity of the porous sheet tends to increase, and the battery resistance tends to decrease. Meanwhile, when the permeability coefficient of the porous sheet is less than $1\times10^{-15}$ m$^2$, such kinetic liquid mixing of the electrolytes of the positive and negative electrodes can be prevented sufficiently. That is, each of the aqueous electrolytes of the positive and negative electrodes can be kept while keeping a desired electrolyte composition thereof. Therefore, the oxidation reaction can be made less likely to occur in the positive electrode, and the reduction reaction can be made less likely to occur in the negative electrode. Thus, the generation of gas on each surface of the positive and negative electrodes is suppressed, and the high coulombic efficiency and cycle life characteristics can be achieved.

A porosity of the porous sheet is preferably set to 60% or more. Further, a preferable fiber diameter is 10 μm or less. The fiber diameter is set to 10 μm or less, whereby affinity of the porous sheet with the electrolyte is increased, and therefore, battery resistance can be reduced. A more preferable range of the fiber diameter is 3 μm or less. Cellulose fiber-containing nonwoven fabric with a porosity of 60% or more has good impregnability for the electrolyte, and can exert high output performance in a wide temperature range. Moreover, the porous sheet does not react with the negative electrode even under long-term charge storage, floating charge and overcharge, and does not cause a short circuit between the negative electrode and the positive electrode due to dendrite deposition of the lithium metal. A more preferable range of porosity is 62% to 80%.

The porous sheet preferably has a thickness of 20 μm or more and 100 μm or less, and a density of 0.2 g/cm$^3$ or more and 0.9 g/cm$^3$ or less. When the thickness and the density stay within these ranges, mechanical strength and reduction of the battery resistance can be balanced, and a secondary battery with a high output and a suppressed internal short circuit can be provided. Further, heat shrink of the separator under a high-temperature environment is slight, and favorable high-temperature storage performance can be exerted.

The separator preferably includes a solid electrolyte membrane containing a solid electrolyte that has lithium ion conductivity of $1\times10^{-10}$ S/cm or more at 25° C., and/or a porous sheet in which a permeability coefficient ranges from $1\times10^{-19}$ m$^2$ or more to less than $1\times10^{-15}$ m$^2$. In this case, temporal thermodynamic mixing of the first aqueous electrolyte and the second aqueous electrolyte can be suppressed kinetically. Therefore, excellent coulombic efficiency and cycle life characteristics can be achieved.

A permeability coefficient of the composite solid electrolyte membrane ranges, for example, from $1\times10^{-19}$ m$^2$ or more to $1\times10^{-15}$ m$^2$ or less, and preferably ranges from $1\times10^{-18}$ m$^2$ or more to less than $1\times10^{-16}$ m$^2$. The permeability coefficient of the solid electrolyte membrane or the composite solid electrolyte membrane can be lowered (that is, air permeability can be degraded), for example, by elongating a hot press time or increasing a hot press pressure when each thereof is produced. Alternatively, when the solid electrolyte membrane or the composite solid electrolyte membrane contains the polymer material, the permeability coefficient can be lowered by increasing a content of the polymer material contained in the membrane. This is because the polymer material is dissolved by hot press to make it easy to fill voids in the membrane therewith.

The first or second polymer material may be used as the third polymer material; however, the third polymer material is desirably a polymer material insoluble to an aqueous solvent. Examples of the polymer material that satisfies this condition include polyethylene terephthalate (PET), polypropylene (PP), polyethylene (PE), and a fluorine-containing polymer material. By using the fluorine-containing polymer material, water repellency can be imparted to the separator. Further, an inorganic solid electrolyte is highly stable against water, and is excellent in lithium ion conductivity. The inorganic solid electrolyte and the fluorine-containing polymer material, which have the lithium ion conductivity, are complexed to each other, whereby it is possible to achieve a flexible solid electrolyte membrane having alkali metal ion conductivity. The separator formed of this solid electrolyte membrane can reduce the resistance, and therefore, large current performance of the secondary battery can be improved.

Examples of the fluorine-containing polymer material include polytetrafluoroethylene (PTFE), polychlorotrifluoroethylene (PCTFE), an ethylene-tetrafluoroethylene copolymer, and polyvinylidenefluoride (PVdF). A type of the fluorine-containing polymer material can be one type or can be two or more types.

When the solid electrolyte membrane contains the third polymer material, a content ratio of the third polymer material in the solid electrolyte membrane is preferably 1 weight % or more and 20 weight % or less. If the content ratio is within this range, then high mechanical strength can be obtained and the resistance can be reduced when the thickness of the solid electrolyte membrane is set within a range of 10 to 100 μm. Further, there is a less possibility that the solid electrolyte may be a cause to hinder the lithium ion conductivity. A preferable range of this ratio is 3 weight % or more and 10 weight % or less.

As the solid electrolyte, it is preferable to use an inorganic solid electrolyte. Examples of the inorganic solid electrolyte can include an oxide-based solid electrolyte or a sulfide-based solid electrolyte. As the oxide-based solid electrolyte, it is preferable to use lithium phosphate solid electrolyte that has a NASICON-type structure and is represented by a general formula LiM$_2$(PO$_4$)$_3$. M in the above-described general formula is preferably at least one or more elements selected from the group consisting of titanium (Ti), germanium (Ge), strontium (Sr), zirconium (Zr), tin (Sn), and aluminum (Al). The element M more preferably contains at least any one element of Ge, Zr and Ti, and Al.

Specific examples of the lithium phosphate solid electrolyte having the NASICON-type structure can include LATP (Li$_{1+x}$Al$_x$Ti$_{2-x}$(PO$_4$)$_3$), Li$_{1+x}$Al$_x$Ge$_{2-x}$(PO$_4$)$_3$ and Li$_{1+x}$Al$_x$Zr$_{2-x}$(PO$_4$)$_3$. x in the above-described formula stays within a range of $0<x\leq5$, and preferably stays within a range of $0.1<x\leq0.5$. As the solid electrolyte, it is preferable to use LATP. LATP is excellent in water resistance, and is less likely to cause hydrolysis in the secondary battery.

Further, as the oxide-based solid electrolyte, also may be used amorphous LIPON(Li$_{2.9}$PO$_{3.3}$N$_{0.46}$), or LLZ (Li$_7$La$_3$Zr$_2$O$_{12}$) with a garnet-type structure.

<Measurement of Lithium Ion Conductivity>

The lithium ion conductivity of the solid electrolyte membrane can be measured as follows. The secondary battery is disassembled in a glove box with an argon atmosphere, and the electrode group including the solid electrolyte membrane as the separator is taken out. The electrode group is cleaned, and is vacuum-dried at room temperature.

Subsequently, a part of the solid electrolyte membrane is scraped off, and the obtained powder is molded into a green pellet by using a tablet molding machine. Gold (Au) electrodes are deposited on both surfaces of this powder compact to form a measurement sample. Thereafter, this measurement sample is subjected to a measurement by using a frequency response analyzer 1260 made by Solartron Analytical Ltd. A measurement frequency range is set to range from 5 Hz to 32 MHz. The measurement is performed under an environment of 25° C. while putting the measurement sample to a dry argon atmosphere without exposing the same to the atmosphere. From a result of the measurement, an alternating current impedance component $Z_{Li}$[ohm] of Li ion conduction is obtained. From this $Z_{Li}$ and from an area S [cm$^2$] and thickness d [cm] of the measurement sample, ion conductivity $\sigma_{Li}$ [S/cm] of the solid electrolyte membrane can be calculated by the following equation.

$$\sigma_{Li}=(1/Z_{Li})\times(d/S)$$

<Measurement of Permeability Coefficient>

The permeability coefficient (m$^2$) is calculated as follows. In the calculation of the permeability coefficient KT, for example, when a separator having a thickness of L (m) is used as a measuring object, a gas having a viscosity coefficient σ (Pa·s) is transmitted through the separator within a measurement area A (m$^2$). In the measurement, the gas is transmitted through the separator under a plurality of conditions in which pressures p (Pa) of the gas to be supplied are different from each other, and quantities Q (m$^3$/s) of the gas transmitted through the separator under the plurality of conditions are measured. From the measurement results, plots of the gas quantities Q versus the pressures p are made, and dQ/dp, which means the slope, is obtained. Then the permeability coefficient KT is calculated from the thickness L, the measurement area A, the viscosity coefficient σ, and the slope dQ/dp according to formula (5).

[Numerical formula 1]

$$KT=((\sigma\cdot l)/A)\times(dQ/dp) \tag{5}$$

An example of methods for calculating the permeability coefficient KT is as follows. A separator is sandwiched between a pair of stainless steel plates each having a hole having a diameter of 10 mm. From the hole of the one stainless steel plate, air is supplied with a pressure p. Then, gas quantity Q of the air escaped from the hole of the other stainless steel plate is measured. Thus, the area of the hole (25π mm$^2$) is applied as the measurement area A, and 0.000018 Pa·s is applied as the viscosity coefficient σ. The gas quantity Q is calculated by measuring the amount of air δ (m³) escaped from the hole within 100 seconds, and dividing the amount δ measured above by 100.

Under 4 conditions with different pressures p that are apart from each other by at least 1000 Pa, gas quantities Q at the pressures p are measured as described above. For example, under 4 conditions with pressures p of 1000 Pa, 2500 Pa, 4000 Pa, and 6000 Pa, gas quantities Q at the pressures p are measured. Then, plots of the gas quantities Q measured under the 4 conditions versus the pressures p are made, and dQ/dp, which means the slope of the plotted curve of the gas quantities Q versus the pressures p, is obtained by linear fitting (least-squares method). The slope (dQ/dp) obtained above is multiplied by (σ·L)/A to calculate the permeability coefficient KT.

Note that, in measurement of the permeability coefficient of the separator, the battery is disassembled, and the separator are separated from other components of the battery. Both surfaces of each of the separator are rinsed by pure water, and thereafter, the separator is immersed into pure water and left standing for 48 hours or more. Thereafter, both surfaces of the separator are further rinsed by pure water, and the separator is dried for 48 hours or more in a vacuum drying furnace of 100° C., and thereafter, is subjected to the measurement of the permeability coefficient. A lowest measured value of the permeability coefficient, which is obtained at a spot among four spots subjected to the measurement, is defined as the permeability coefficient of the separator.

(6) Container Member

As the container member, for example, a container made of a laminated film or a metal-made container can be used.

A thickness of the laminated film is, for example, 0.5 mm or less, and preferably is 0.2 mm or less.

As the laminated film, a multilayer film is used, which includes a plurality of resin layers and metal layers interposed between these resin layers. The resin layer contains, for example, a polymer material such as a polypropylene (PP), polyethylene (PE), Nylon, and polyethylene terephthalate (PET). The metal layers are preferably formed of aluminum foil or aluminum alloy foil. The laminated film can be molded to a shape of the container member by being sealed using thermal fusion bonding.

A thickness of a wall of the metal-made container is, for example, 1 mm or less, preferably 0.5 mm or less, more preferably 0.2 mm or less.

The metal-made container is made, for example, of aluminum, an aluminum alloy or the like. The aluminum alloy preferably contains an element such as magnesium, zinc, and silicon. When the aluminum alloy contains transition metal such as iron, copper, nickel, and chromium, a content thereof is preferably 100 mass ppm or less.

The shape of the container member is not particularly limited. For example, the shape of the container member may be flat (low profile), rectangular, cylindrical, coin-shaped, or button-shaped. The container member can be appropriately selected according to dimensions of the battery and use of the battery.

The secondary battery according to the present embodiment can be used in a variety of forms such as a rectangular form, a cylindrical form, a flat form, a low-profile form, and a coin form. The secondary battery may be a secondary battery having a bipolar structure. In this case, there is an advantage that a plurality of series cells can be produced by one cell.

An example of the secondary battery according to the embodiment will be described with reference to FIGS. 1, 2, 3, and 4.

FIGS. 1 and 2 show an example of the secondary battery using a metal container.

An electrode group 1 is stored in a rectangular tubular metal container 2 having a bottom. The electrode group 1 has a structure formed by spirally winding a positive electrode 3 and a negative electrode 4 with a separator 5 interposing therebetween so as to form a flat shape. The first aqueous electrolyte (not shown) is held by the positive electrode 3 in the electrode group 1. On the other hand, the second aqueous electrolyte (not shown) is held by the negative electrode 4 in the electrode group 1. As shown in FIG. 2, a strip-shaped positive electrode lead 6 is electrically connected to each of a plural of portions at an end of the positive electrode 3 located on an end face of the electrode group 1. A strip-shaped negative electrode lead 7 is electrically connected to each of a plural of portions at an end of the negative electrode 4 located on the end face. The plural of positive electrode leads 6 are bundled, and in this state, electrically connected to a positive electrode tab 8. A positive electrode terminal is formed from the positive electrode leads 6 and the positive electrode tab 8. In addition, the negative electrode leads 7 are bundled, and in this state, connected to a negative electrode tab 9. A negative electrode terminal is formed from the negative electrode leads 7 and the negative electrode tab 9. A sealing plate 10 made of a metal is fixed to the opening portion of the metal container 2 by welding or the like. The positive electrode tab 8 and the negative electrode tab 9 are extracted to the outside from outlet holes formed in the sealing plate 10, respectively. The inner surface of each outlet hole of the sealing plate 10 is coated with an insulating member 11 to avoid a short circuit caused by contact between the positive electrode tab 8 and the sealing plate 10, or by contact between the negative electrode tab 9 and the sealing plate 10.

Figure 3:
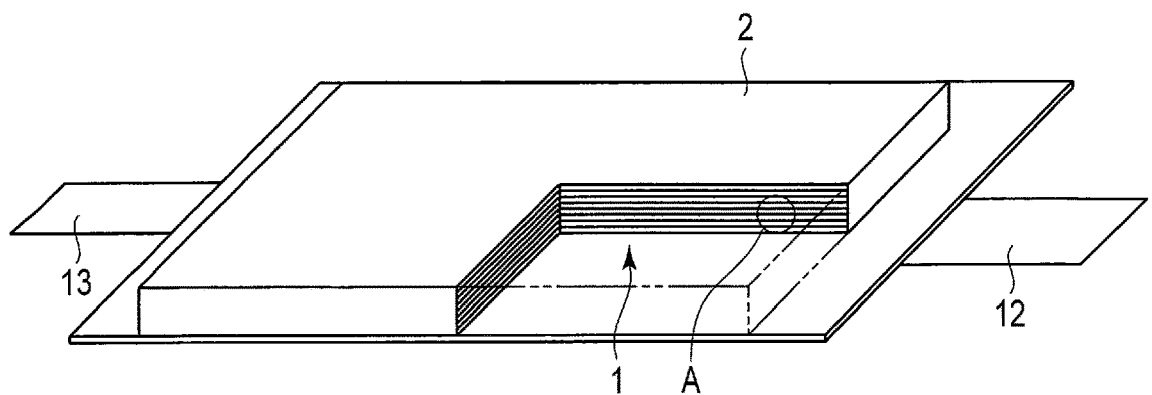
FIG. 3 is a partially cutaway perspective view schematically illustrating another example of the secondary battery of the embodiment.
Figure 4:
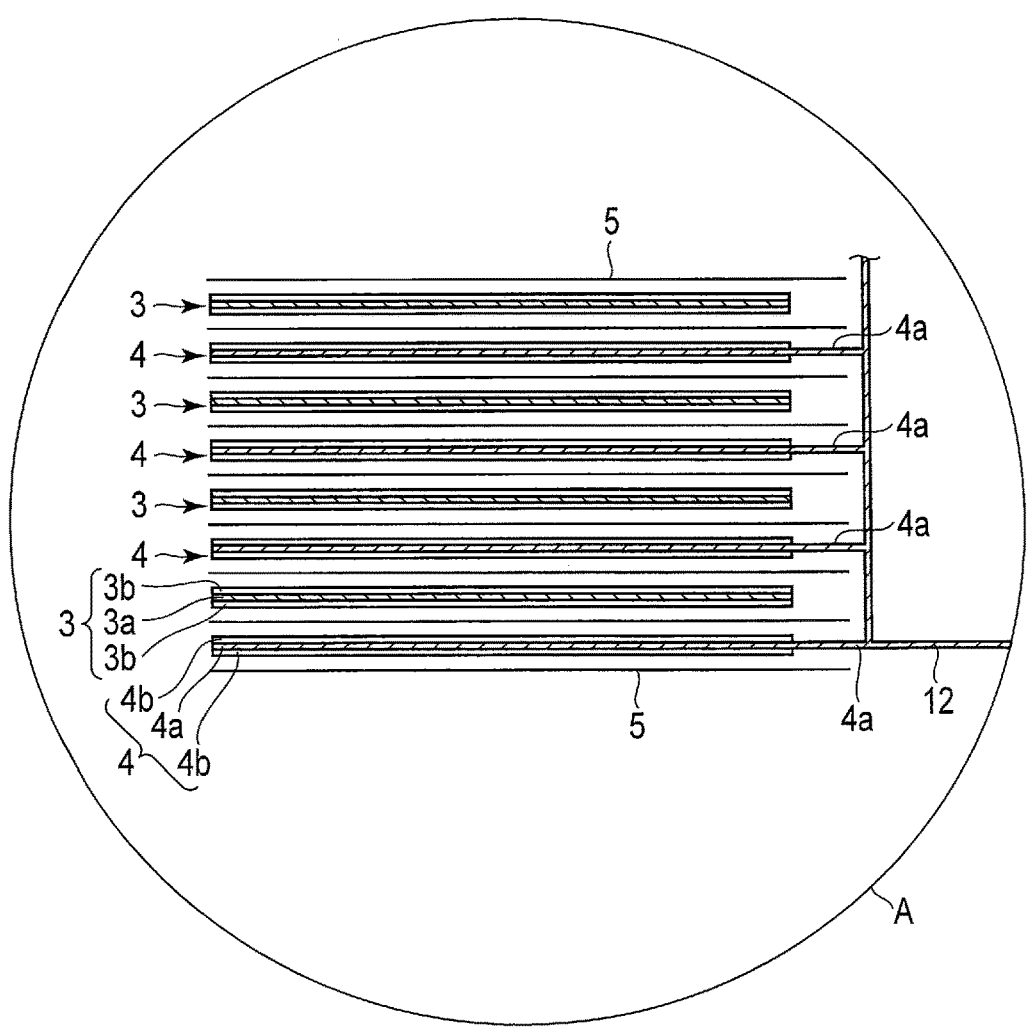
FIG. 4 is an enlarged cross-sectional view of a portion A of FIG. 3.

FIGS. 3 and 4 show an example of a secondary battery including a container member made of a laminated film.

The stacked electrode group 1 is stored in the sack-shaped container 2 made of a laminated film including a metal layer interposing between two resin films. The first electrolyte (not shown) is held by the positive electrode 3 in the electrode group 1. On the other hand, the second electrolyte (not shown) is held by the negative electrode 4 in the electrode group 1. As shown in FIG. 4, the stacked electrode group 1 has a structure formed by alternately stacking the positive electrodes 3 and the negative electrodes 4 with the separators 5 interposing therebetween. A plural of positive electrodes 3 exist, each of which includes a current collector 3a and positive electrode active material-containing layers 3b formed on both surfaces of the current collector 3a. A plural of negative electrodes 4 exist, each of which includes a current collector 4a and negative electrode active material-containing layers 4b formed on both surfaces of the current collector 4a. The current collector 4a of each negative electrode 4 has one side projecting from the positive electrodes 3. Each projecting current collector 4a is electrically connected to a strip-shaped negative electrode terminal 12. The distal end of a strip-shaped negative electrode terminal 12 is extracted from the container 2 to the outside. Although not illustrated, in the current collector 3a of each positive electrode 3, a side located on a side opposite to the projecting sides of the current collectors 4a projects from the negative electrodes 4. Each current collector 3a projecting from the negative electrodes 4 is electrically connected to a strip-shaped positive electrode terminal 13. The distal end of the strip-shaped positive electrode terminal 13 is located on the side opposite to the negative electrode terminal 12 and extracted from the side of the container 2 to the outside. The separators 5 are located on both outermost layers of the electrode group 1. The separator 5 on one outermost layer faces the positive electrode 3, and the separator 5 on the other outermost layer faces the negative electrode 4.

The secondary battery shown in FIGS. 1, 2, 3, and 4 can be provided with a rupture member to discharge hydrogen gas generated in the container to the outside. As the rupture member, either a reset type that operates when the internal pressure exceeds a set value and functions as a sealing plug when the internal pressure lowers, or a non-reset type that cannot recover the function as a sealing plug once it operates can be used. The secondary battery shown in FIGS. 1, 2, 3, and 4 is a close type. However, if a circulation system configured to return hydrogen gas to water is provided, an open system can be employed.

In accordance with the first embodiment described above, a secondary battery is provided. The secondary battery includes: a positive electrode containing a positive electrode active material; a negative electrode; a separator arranged between the positive electrode and the negative electrode; and a first aqueous electrolyte held in at least the positive electrode. pH of the first aqueous electrolyte is more than 7. The positive electrode active material contains a lithium-containing compound that exhibits an average operating potential of less than 4.0 V based on lithium metal. In the secondary battery, the proton exchange for the positive electrode active material is suppressed, and in addition, the generation of oxygen in the positive electrodes is also suppressed. Hence, the secondary battery according to the embodiment can achieve excellent cycle life characteristics.

Second Embodiment

According to a second embodiment, a battery module is provided. The battery module according to the second embodiment includes plural secondary batteries according to the first embodiment.

In the battery module according to the second embodiment, each of the single batteries may be arranged electrically connected in series, in parallel, or in a combination of in-series connection and in-parallel connection.

An example of the battery module according to the second embodiment will be described next with reference to the drawings.

Figure 5:
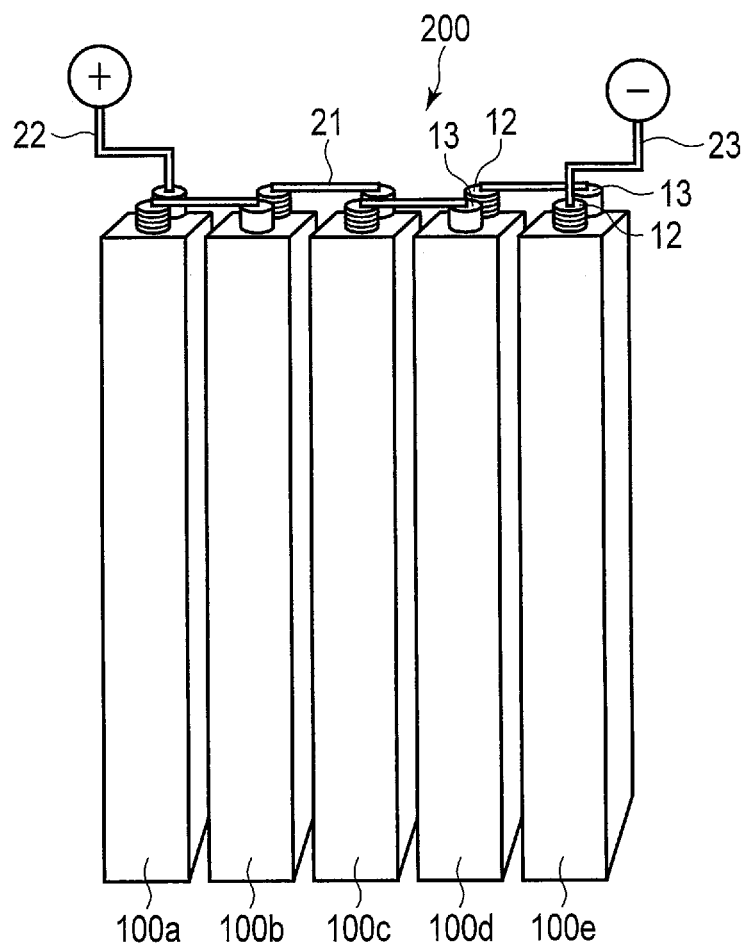
FIG. 5 is a perspective view schematically illustrating an example of an assembled battery according to the embodiment.

FIG. 5 is a perspective view schematically showing an example of the battery module according to the second embodiment. A battery module 200 shown in FIG. 5 includes five single-batteries 100a to 100e, four bus bars 21, a positive electrode-side lead 22, and a negative electrode-side lead 23. Each of the five single-batteries 100a to 100e is a secondary battery according to the first embodiment.

The bus bars 21 connects a negative electrode terminal 12 of a single unit cell 100a to a positive electrode terminal 13 of an adjacently positioned unit cell 100b. In this way, the five unit cells 100a to 100e are connected in series by the four bus bars 21. That is, the battery module 200 shown in FIG. 5 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 13 of at least one battery among the five unit cells 100a to 100e is electrically connected to a positive electrode lead 22 for external connection. Also, the negative electrode terminal 12 of at least one battery among the five unit cells 100a to 100e is electrically connected to a negative electrode lead 23 for external connection.

An battery module according to a second embodiment includes the secondary battery according to the first embodiment. Hence, the battery module can exhibit excellent cycle life characteristics.

Third Embodiment

According to the third embodiment, a battery pack is provided. The battery pack includes the battery module according to the second embodiment. The battery pack may also be equipped with a single secondary battery according to the first embodiment instead of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the third embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the third embodiment will be described with reference to the drawings.

Figure 7:
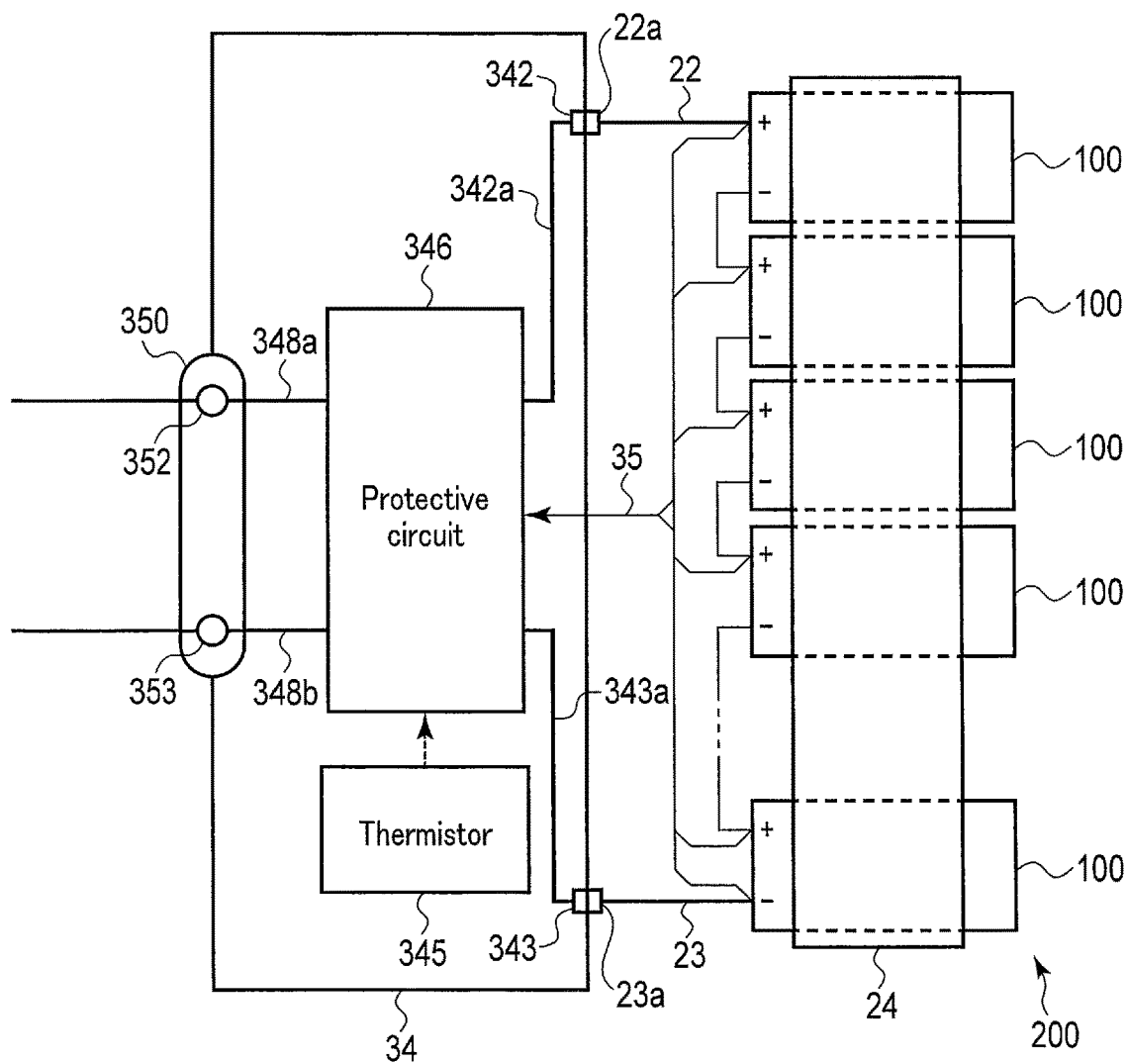
FIG. 7 is a block diagram illustrating an electrical circuit of the battery pack illustrated in FIG. 6.

FIG. 6 is an exploded perspective view schematically showing an example of the battery pack according to the third embodiment. FIG. 7 is a block diagram showing an example of an electric circuit of the battery pack shown in FIG. 6.

A battery pack 300 shown in FIGS. 6 and 7 includes a housing container 31, a lid 32, protective sheets 33, a battery module 200, a printed wiring board 34, wires 35, and an insulating plate (not shown).

A housing container 31 shown in FIG. 6 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the second embodiment. Each unit cell 100 in the plurality of unit cells 100 is electrically connected in series, as shown in FIG. 7. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342a and 343a, an external power distribution terminal 350, a plus-side wire (positive-side wire) 348a, and a minus-side wire (negative-side wire) 348b. One principal surface of the printed wiring board 34 faces one side surface of the battery module 200. An insulating plate (not shown) is disposed in between the printed wiring board 34 and the battery module 200.

The other terminal 22a of the positive electrode lead 22 is electrically connected to a positive electrode connector 342. The other terminal 23a of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348a. The protective circuit 346 is connected to the negative side terminal 353 via the minus-side wire 348b. In addition, the protective circuit 346 is electrically connected to the positive electrode connector 342 via the wiring 342a. The protective circuit 346 is electrically connected to the negative electrode connector 343 via the wiring 343a. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. when detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

A battery pack according to a third embodiment includes the secondary battery according to the first embodiment or the battery module according to the second embodiment. Hence, this battery pack can exhibit excellent cycle life characteristics.

Fourth Embodiment

According to the fourth embodiment, a vehicle is provided. The vehicle includes the battery pack according to the third embodiment.

In a vehicle according to the fourth embodiment, the battery pack is configured, for example, to recover regenerative energy from motive force of the vehicle. The vehicle may include a mechanism configured to convert kinetic energy of the vehicle into regenerative energy.

Examples of the vehicle according to the fourth embodiment include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

A plurality of battery packs is loaded on the vehicle. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the fourth embodiment will be described with reference to the drawings.

Figure 8:
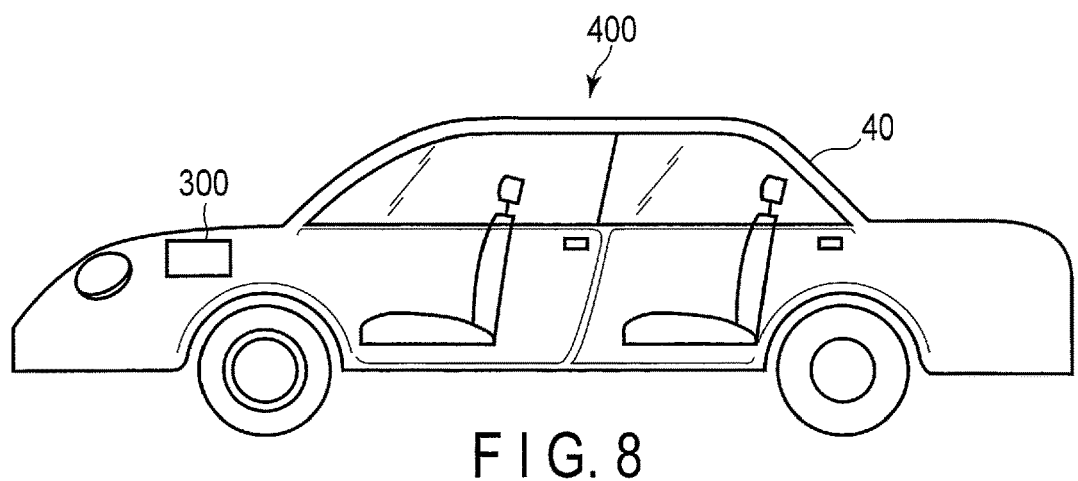
FIG. 8 is a cross-sectional view schematically illustrating an example of a vehicle according to the embodiment.

FIG. 8 is a partially transparent diagram schematically illustrating one example of a vehicle according to the embodiment.

A vehicle 400 illustrated in FIG. 8 includes a vehicle body 40 and a battery pack 300 according to the embodiment. In the example illustrated in FIG. 8, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 8, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the fourth embodiment will be described with reference to FIG. 9.

Figure 9:
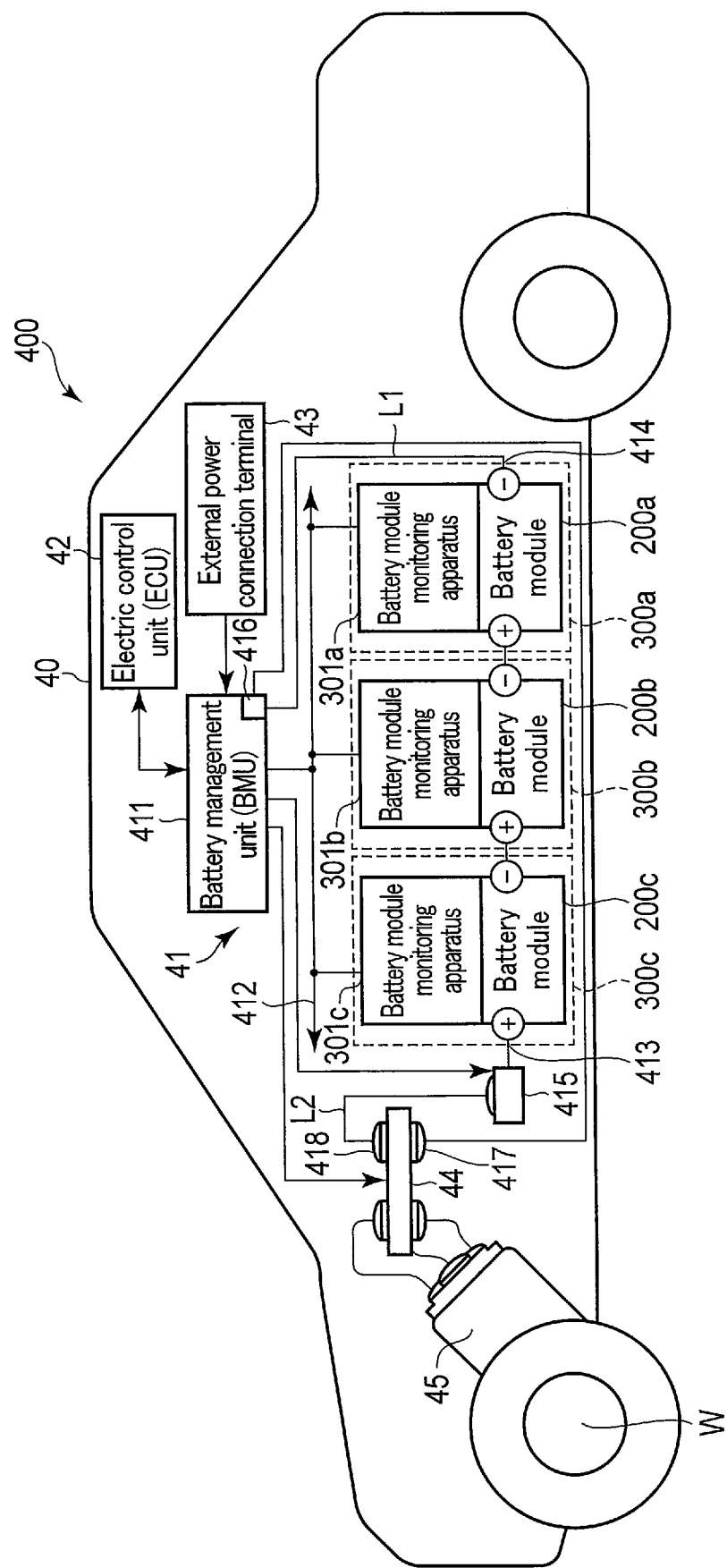
FIG. 9 is a view schematically illustrating another example of the vehicle according to the embodiment.

FIG. 9 is a diagram schematically illustrating one example of a control system related to an electrical system in the vehicle according to the fourth embodiment. The vehicle 400 illustrated in FIG. 9 is an electric automobile.

The vehicle 400, shown in FIG. 9, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 9, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 9) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line L1 is connected to the negative electrode terminal 414 of the vehicle power source 41. The other terminal of the connection line L1 is connected to a negative electrode input terminal 417 of the inverter 44. On the connection line L1, a current detector (current detection circuit) 416 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

A vehicle according to a fourth embodiment mounts thereon the battery pack according to the third embodiment. Therefore, in accordance with the present embodiment, a vehicle can be provided, which mounts thereon the battery pack that can exhibit excellent cycle life characteristics.

EXAMPLES

Examples will be described below, but the embodiments are not limited to the examples to be described below.

In the specification of the present application, $LiNi_{0.5}Co_{0.2}Mn_{0.3}O_2$ will be referred to as "NCM523." $LiNi_{0.5}Co_{0.1}Mn_{0.1}O_2$ will be referred to as "NCM811." $LiNi_{0.6}Co_{0.2}Mn_{0.2}O_2$ will be referred to as "NCM622." $LiNi_{0.333}Co_{0.333}Mn_{0.333}O_2$ will be referred to as "NCM111." $LiNi_{0.5}Mn_{0.5}O_2$ will be referred to as "NM55." $LiNi_{0.5}Co_{0.5}O_2$ will be referred to as "NC55." An average operating potential of NCM523 is 3.9 V (vs. $Li/Li^+$). An average operating potential of NCM811 is 3.8 V (vs. Li/Lit). An average operating potential of NCM622 is 3.85 V (vs. $Li/Li^+$). An average operating potential of NCM111 is 3.95 V (vs. $Li/Li^+$). An average operating potential of NM55 is 3.95 V (vs. $Li/Li^+$). An average operating potential of NC55 is 3.95 V (vs. $Li/Li^+$).

In a lithium-containing compound having a rock salt-type crystal structure, such as the lithium nickel cobalt manganese composite oxide (NCM), the average operating potential thereof tends to drop more as a ratio of nickel contained in the lithium-containing compound per mol increases.

Example 1

<Production of Positive Electrode>

A positive electrode was produced as follows.

NCM523 (5 g) having the rock salt-type crystal structure and serving as a positive electrode active material, acetylene black (0.25 g) serving as an electro-conductive agent, and a PVDF dispersion liquid (NMP solution with a solid fraction of 8%, 6.25 g) serving as a binder were mixed with one another for 3 minutes by using a kneader, and viscous slurry was obtained. This slurry was coated onto one surface of Ti foil. Thereafter, a solvent was evaporated at 120° C. to obtain a stack. Subsequently, this stack was rolled by using a roll press. Thereafter, this stack was dried, and was then stamped into a shape of circle with a diameter of 10 mm.

<Production of Negative Electrode>

$Li_4Ti_5O_{12}$ (10 g) serving as a negative electrode active material, graphite (1 g) serving as an electro-conductive agent, a PTFE dispersion liquid (40 weight % of solid content, 1 g) serving as a binder, and 8 g of NMP (N-methyl-2-pyrrolidone) were mixed with one another for 3 minutes by using a kneader, and slurry was obtained. This slurry was coated onto one surface of Zn foil. Thereafter, a solvent was evaporated at 120° C. to obtain a stack. Subsequently, this stack was rolled by using a roll press. Thereafter, this stack was dried, and was then stamped into a shape of circle with a diameter of 10 mm.

<Adjustment of Aqueous Electrolyte>

As the first aqueous electrolyte (positive electrode-side aqueous electrolyte) and the second aqueous electrolyte (negative electrode-side aqueous electrolyte), liquid electrolytes were prepared, each of which contains lithium chloride (LiCl) with a concentration of 12 mol/L. With regard to one of them, pH of the first aqueous electrolyte was adjusted to 7.4 by using lithium hydroxide (LiOH) as a reagent for pH adjustment. With regard to the other, pH of the second aqueous electrolyte was adjusted to 13.0 by using sodium hydroxide (NaOH) as a reagent for pH adjustment.

<Production of Separator>

LATP ($Li_{1.3}Al_{0.3}Ti_{1.7}(PO_4)_3$) as inorganic solid electrolyte particles and polyvinyl butyral (PVB) as a polymer material were dispersed into NMP as a solvent, and slurry for forming a solid electrolyte membrane was prepared. A mixing ratio (mass ratio) of the LATP and the PVB was 9:1. The obtained slurry was coated onto nonwoven fabric, and a resultant was hot pressed for 60 seconds at a temperature of 130° C., whereby a composite solid electrolyte membrane was produced.

<Production of Secondary Battery for Testing>

An aluminum plate was fixed onto a plastic plate, and the negative electrode was fixed thereonto. A Ti plate was fixed onto another plastic plate, and the positive electrode was fixed thereonto. The previously produced second aqueous electrolyte was dropped onto the negative electrode, the separator was put thereon, and the negative electrode and the separator were adhered to each other. The first aqueous electrolyte was dropped onto a surface of the separator, which was not in contact with the negative electrode, the positive electrode was put thereon, and the separator and the positive electrode were adhered to each other. Thereafter, two plastic plates which sandwich the negative electrode, the separator and the positive electrode therebetween were fixed to each other by screws.

Examples 2 to 7

Secondary batteries were manufactured in the same manner as in Example 1 except for changing the pH of the first aqueous electrolyte as shown in Table 1.

Examples 8 to 13

Secondary batteries were manufactured in the same manner as in Example 1 except for changing the pH of the first and second aqueous electrolytes as shown in Table 1.

Examples 14 to 26

Secondary batteries were manufactured in the same manner as in Example 1 except for using, as the positive electrode active material, the NCM811 in place of the NCM523 and changing the pH of the first and second aqueous electrolytes as shown in Table 1.

Examples 27 to 39

Secondary batteries were manufactured in the same manner as in Example 1 except for using, as the positive electrode active material, the NCM622 in place of the NCM523 and changing the pH of the first and second aqueous electrolytes as shown in Table 2.

Examples 40 to 52

Secondary batteries were manufactured in the same manner as in Example 1 except for using, as the positive electrode active material, the NCM111 in place of the NCM523 and changing the pH of the first and second aqueous electrolytes as shown in Table 2.

Examples 53 to 65

Secondary batteries were manufactured in the same manner as in Example 1 except for using, as the positive electrode active material, the NM55 in place of the NCM523 and changing the pH of the first and second aqueous electrolytes as shown in Table 3.

Examples 66 to 78

Secondary batteries were manufactured in the same manner as in Example 1 except for using, as the positive electrode active material, the NC55 in place of the NCM523 and changing the pH of the first and second aqueous electrolytes as shown in Table 3.

Examples 79 to 90

Secondary batteries were manufactured in the same manner as in Example 1 except for using, as the positive electrode active material, $LiFe(PO_4)_3$ having the olivine-type crystal structure in place of the NCM523 and changing the pH of the first and second aqueous electrolytes as shown in Table 4. An average operating potential of $LiFe(PO_4)_3$ having the olivine-type crystal structure is 3.5 V (vs. $Li/Li^+$).

Example 91

A secondary battery was manufactured in the same manner as in Example 1 except for changing the PH of the first aqueous electrolyte as shown in Table 4 and using, as the separator, a composite solid electrolyte membrane with a permeability coefficient of $1 \times 10^{-16}$ $m^2$.

The composite solid electrolyte membrane with a permeability coefficient of $1 \times 10^{-16}$ $m^2$ was produced in the same manner as in the composite solid electrolyte membrane produced in Example 1 except for implementing the hot press at 100° C. When a hot press temperature is lowered, the polymer material as a binder is difficult to soften, and therefore, compactness of the composite solid electrolyte membrane is difficult to increase. In other words, a composite solid electrolyte membrane with a high permeability coefficient (high air permeability) can be produced.

Example 92

A secondary battery was manufactured in the same manner as in Example 91 except for using, as the positive electrode active material, $LiFe(PO_4)_3$ having the olivine-type crystal structure.

Example 93

A secondary battery was manufactured in the same manner as in Example 91 except for using, as the separator, a composite solid electrolyte membrane with a permeability coefficient of $1 \times 10^{-18}$ $m^2$.

The composite solid electrolyte membrane with a permeability coefficient of $1 \times 10^{-18}$ $m^2$ was produced in the same manner as in the composite solid electrolyte membrane produced in Example 1 except for setting the mixing ratio (mass ratio) of the LATP and the PVB to 8:2. When the content of the polymer material as a binder in the solid electrolyte membrane increases, a compact membrane with a low permeability coefficient (low air permeability) can be produced.

Example 94

A secondary battery was manufactured in the same manner as in Example 93 except for using, as the positive electrode active material, $LiFe(PO_4)_3$ having the olivine-type crystal structure.

Example 95

A secondary battery was manufactured in the same manner as in Example 91 except for using, as the separator, an LATP solid electrolyte membrane with a permeability coefficient of 0 $m^2$. The LATP solid electrolyte membrane was produced as follows. First, as raw material powders, powders of $Li_2O$, $Al_2O_3$, $TiO_2$ and $P_2O_5$ were prepared. These were mixed with one another and sintered at a temperature of 500° C. or more. At this time, the powders were sintered while being pressurized, whereby an LATP solid electrolyte membrane with a high density and a small number of particles interfaces was produced. Li ion conductivity of the LATP solid electrolyte membrane, which was measured in accordance with the method described in the first embodiment, was $3.0 \times 10^{-4}$ S/cm.

Example 96

A secondary battery was manufactured in the same manner as in Example 95 except for using, as the positive electrode active material, $LiFe(PO_4)_3$ having the olivine-type crystal structure.

Example 97

A secondary battery was manufactured in the same manner as in Example 91 except for using, as the separator, a porous film with a permeability coefficient of $1 \times 10^{-15}$ $m^2$.

Example 98

A secondary battery was manufactured in the same manner as in Example 97 except for using, as the positive electrode active material, $LiFe(PO_4)_3$ having the olivine-type crystal structure.

Example 99

A secondary battery was manufactured in the same manner as in Example 91 except for using, as the separator, a porous film with a permeability coefficient of $1 \times 10^{-16}$ $m^2$.

Example 100

A secondary battery was manufactured in the same manner as in Example 99 except for using, as the positive electrode active material, $LiFe(PO_4)_3$ having the olivine-type crystal structure.

Example 101

A secondary battery was manufactured in the same manner as in Example 95 except for using, as the separator, an alumina ($Al_2O_3$) ceramic membrane with a permeability coefficient of 0 $m^2$. Li ion conductivity of the alumina ceramic membrane, which was measured in accordance with the method described in the first embodiment, was 0 S/cm. The alumina ceramic membrane was produced by heating $Al_2O_3$ particles while pressurizing the same under an environment of 1000° C.

Example 102

A secondary battery was manufactured in the same manner as in Example 101 except for using, as the positive electrode active material, $LiFe(PO_4)_3$ having the olivine-type crystal structure.

Example 103

A secondary battery was manufactured in the same manner as in Example 91 except for using, as the separator, a porous film with a permeability coefficient of $1 \times 10^{-13}$ $m^2$.

Example 104

A secondary battery was manufactured in the same manner as in Example 103 except for using, as the positive electrode active material, $LiFe(PO_4)_3$ having the olivine-type crystal structure.

Comparative Examples 1 and 2

Secondary batteries were manufactured in the same manner as in Example 1 except for changing the pH of the first aqueous electrolyte as shown in Table 5.

Comparative Examples 3 and 4

Secondary batteries were manufactured in the same manner as in Example 1 except for using, as the positive electrode active material, $LiCoPO_4$ with an average operating potential of 4.7 V (vs. $Li/Li^+$) in place of the NCM523 and changing the pH of the first aqueous electrolyte as shown in Table 5.

Comparative Example 5

A secondary battery was manufactured in the same manner as in Example 1 except for using, as the positive electrode active material, a lithium-manganese composite oxide ($Li_xMn_2O_4$: LMO) with an average operating potential of 4.0 V (vs. $Li/Li^+$) and changing the pH of the first aqueous electrolyte as shown in Table 5.

Comparative Example 6

A secondary battery was manufactured in the same manner as in Comparative example 5 except for using, as the positive electrode active material, $LiNi_{0.5}Mn_{0.5}O_4$ having a rock salt structure with an average operating potential of 4.1 V (vs. $Li/Li^+$).

Comparative Example 7

A secondary battery was manufactured in the same manner as in Comparative example 5 except for using, as the positive electrode active material, $LiNi_{0.5}Mn_{1.5}O_4$ having a spinel-type crystal structure with an average operating potential of 4.6 V (vs. $Li/Li^+$).

Comparative Example 8

A secondary battery was manufactured in the same manner as in Comparative example 5 except for using, as the positive electrode active material, $LiCoO_2$ with an average operating potential of 4.2 V (vs. $Li/Li^+$).

<Constant Current Charge-and-Discharge Test>

For the secondary battery for testing, which was manufactured in each of the examples, testing was started rapidly with no waiting time after the battery was manufactured. Both of charge and discharge were performed at the 0.5 C rate. At the time of charge, a termination condition thereof was set to be one terminated earliest from among that a current value becomes 0.25 C, that a charge time reaches 130 minutes, and that a charge capacity reaches 170 mAh/g. At the time of discharge, a termination condition thereof was set to be the elapse of 130 minutes.

The above-described charge performed once and the above-described discharge performed once were defined to form one cycle of charge and discharge, and from a charge capacity and a 20th-cycle discharge capacity, coulombic efficiency (charge-and-discharge efficiency) was calculated by percentage in accordance with the following equation. [coulombic efficiency] (%)=100×[discharge capacity]/[charge capacity]

Further, the charge-and-discharge cycle was repeated, and a 100th-cycle discharge capacity was measured. Then, the 100th-cycle discharge capacity (mAh/g) (discharge capacity retention rate) with respect to a 5th-cycle discharge capacity (mAh/g) was calculated by percentage in accordance with the following equation. [discharge capacity retention rate] (%)=100×[100th-cycle discharge capacity]/[5th-cycle discharge capacity]

<Measurement of Permeability Coefficient>

The secondary battery according to each of the examples was disassembled in accordance with the method described in the first embodiment, and the permeability coefficient of the separator was measured.

The above results are summarized in Table 1 to Table 5. Table 1 to Table 5 show those in each of the examples, which are: the composition of the positive electrode active material; the average operating potential (V) of the positive electrode active material; the composition of the first aqueous electrolyte; the pH of the first aqueous electrolyte; the composition of the second aqueous electrolyte; the pH of the second aqueous electrolyte; the type or composition of the separator; the permeability coefficient of the separator; the post-20-cycle charge-and-discharge efficiency (%); and the post-100-cycle discharge capacity retention rate (%).

TABLE 1

| | Composition of positive electrode active material | Average operating potential of positive electrode active material (V) | Composition of first aqueous electrolyte (positive electrode side) | pH of first aqueous electrolyte | Composition of second aqueous electrolyte (negative electrode side) | pH of second aqueous electrolyte |
|---|---|---|---|---|---|---|
| Example 1 | $LiNi_{0.5}Co_{0.2}Mn_{0.3}O_2$ | 3.9 | 12 mol/L LiCl | 7.4 | 12 mol/L LiCl | 13.0 |
| Example 2 | $LiNi_{0.5}Co_{0.2}Mn_{0.3}O_2$ | 3.9 | 12 mol/L LiCl | 7.9 | 12 mol/L LiCl | 13.0 |
| Example 3 | $LiNi_{0.5}Co_{0.2}Mn_{0.3}O_2$ | 3.9 | 12 mol/L LiCl | 8.2 | 12 mol/L LiCl | 13.0 |
| Example 4 | $LiNi_{0.5}Co_{0.2}Mn_{0.3}O_2$ | 3.9 | 12 mol/L LiCl | 9.0 | 12 mol/L LiCl | 13.0 |
| Example 5 | $LiNi_{0.5}Co_{0.2}Mn_{0.3}O_2$ | 3.9 | 12 mol/L LiCl | 11.0 | 12 mol/L LiCl | 13.0 |
| Example 6 | $LiNi_{0.5}Co_{0.2}Mn_{0.3}O_2$ | 3.9 | 12 mol/L LiCl | 12.5 | 12 mol/L LiCl | 13.0 |
| Example 7 | $LiNi_{0.5}Co_{0.2}Mn_{0.3}O_2$ | 3.9 | 12 mol/L LiCl | 13.5 | 12 mol/L LiCl | 13.0 |
| Example 8 | $LiNi_{0.5}Co_{0.2}Mn_{0.3}O_2$ | 3.9 | 12 mol/L LiCl | 13.0 | 12 mol/L LiCl | 7.5 |
| Example 9 | $LiNi_{0.5}Co_{0.2}Mn_{0.3}O_2$ | 3.9 | 12 mol/L LiCl | 13.0 | 12 mol/L LiCl | 8.2 |
| Example 10 | $LiNi_{0.5}Co_{0.2}Mn_{0.3}O_2$ | 3.9 | 12 mol/L LiCl | 13.0 | 12 mol/L LiCl | 9.0 |
| Example 11 | $LiNi_{0.5}Co_{0.2}Mn_{0.3}O_2$ | 3.9 | 12 mol/L LiCl | 13.0 | 12 mol/L LiCl | 11.0 |
| Example 12 | $LiNi_{0.5}Co_{0.2}Mn_{0.3}O_2$ | 3.9 | 12 mol/L LiCl | 13.0 | 12 mol/L LiCl | 12.5 |
| Example 13 | $LiNi_{0.5}Co_{0.2}Mn_{0.3}O_2$ | 3.9 | 12 mol/L LiCl | 13.0 | 12 mol/L LiCl | 13.5 |
| Example 14 | $LiNi_{0.8}Co_{0.1}Mn_{0.1}O_2$ | 3.8 | 12 mol/L LiCl | 7.5 | 12 mol/L LiCl | 13.0 |
| Example 15 | $LiNi_{0.8}Co_{0.1}Mn_{0.1}O_2$ | 3.8 | 12 mol/L LiCl | 8.0 | 12 mol/L LiCl | 13.0 |
| Example 16 | $LiNi_{0.8}Co_{0.1}Mn_{0.1}O_2$ | 3.8 | 12 mol/L LiCl | 8.3 | 12 mol/L LiCl | 13.0 |
| Example 17 | $LiNi_{0.8}Co_{0.1}Mn_{0.1}O_2$ | 3.8 | 12 mol/L LiCl | 9.2 | 12 mol/L LiCl | 13.0 |
| Example 18 | $LiNi_{0.8}Co_{0.1}Mn_{0.1}O_2$ | 3.8 | 12 mol/L LiCl | 11.1 | 12 mol/L LiCl | 13.0 |
| Example 19 | $LiNi_{0.8}Co_{0.1}Mn_{0.1}O_2$ | 3.8 | 12 mol/L LiCl | 12.6 | 12 mol/L LiCl | 13.0 |
| Example 20 | $LiNi_{0.8}Co_{0.1}Mn_{0.1}O_2$ | 3.8 | 12 mol/L LiCl | 13.6 | 12 mol/L LiCl | 13.0 |
| Example 21 | $LiNi_{0.8}Co_{0.1}Mn_{0.1}O_2$ | 3.8 | 12 mol/L LiCl | 13.0 | 12 mol/L LiCl | 7.5 |
| Example 22 | $LiNi_{0.8}Co_{0.1}Mn_{0.1}O_2$ | 3.8 | 12 mol/L LiCl | 13.0 | 12 mol/L LiCl | 8.2 |
| Example 23 | $LiNi_{0.8}Co_{0.1}Mn_{0.1}O_2$ | 3.8 | 12 mol/L LiCl | 13.0 | 12 mol/L LiCl | 9.0 |
| Example 24 | $LiNi_{0.8}Co_{0.1}Mn_{0.1}O_2$ | 3.8 | 12 mol/L LiCl | 13.0 | 12 mol/L LiCl | 11.0 |
| Example 25 | $LiNi_{0.8}Co_{0.1}Mn_{0.1}O_2$ | 3.8 | 12 mol/L LiCl | 13.0 | 12 mol/L LiCl | 12.5 |
| Example 26 | $LiNi_{0.8}Co_{0.1}Mn_{0.1}O_2$ | 3.8 | 12 mol/L LiCl | 13.0 | 12 mol/L LiCl | 13.5 |

| | Type or composition of separator | Permeability coefficient of separator (m$^2$) | charge-and-discharge efficiency after 20 cycles (%) | discharge capacity retention rate after 100 cycles (%) |
|---|---|---|---|---|
| Example 1 | Composite solid electrolyte membrane | $1 \times 10^{-17}$ | 95 | 70 |
| Example 2 | Composite solid electrolyte membrane | $1 \times 10^{-17}$ | 95 | 73 |
| Example 3 | Composite solid electrolyte membrane | $1 \times 10^{-17}$ | 95 | 75 |
| Example 4 | Composite solid electrolyte membrane | $1 \times 10^{-17}$ | 96 | 80 |
| Example 5 | Composite solid electrolyte membrane | $1 \times 10^{-17}$ | 96 | 85 |
| Example 6 | Composite solid electrolyte membrane | $1 \times 10^{-17}$ | 97 | 90 |
| Example 7 | Composite solid electrolyte membrane | $1 \times 10^{-17}$ | 98 | 95 |
| Example 8 | Composite solid electrolyte membrane | $1 \times 10^{-17}$ | 95 | 84 |
| Example 9 | Composite solid electrolyte membrane | $1 \times 10^{-17}$ | 95 | 86 |
| Example 10 | Composite solid electrolyte membrane | $1 \times 10^{-17}$ | 95 | 88 |
| Example 11 | Composite solid electrolyte membrane | $1 \times 10^{-17}$ | 96 | 90 |
| Example 12 | Composite solid electrolyte membrane | $1 \times 10^{-17}$ | 97 | 92 |
| Example 13 | Composite solid electrolyte membrane | $1 \times 10^{-17}$ | 98 | 95 |
| Example 14 | Composite solid electrolyte membrane | $1 \times 10^{-17}$ | 97 | 73 |
| Example 15 | Composite solid electrolyte membrane | $1 \times 10^{-17}$ | 97 | 76 |
| Example 16 | Composite solid electrolyte membrane | $1 \times 10^{-17}$ | 97 | 78 |
| Example 17 | Composite solid electrolyte membrane | $1 \times 10^{-17}$ | 98 | 83 |
| Example 18 | Composite solid electrolyte membrane | $1 \times 10^{-17}$ | 98 | 88 |
| Example 19 | Composite solid electrolyte membrane | $1 \times 10^{-17}$ | 99 | 93 |
| Example 20 | Composite solid electrolyte membrane | $1 \times 10^{-17}$ | 99.5 | 98 |

TABLE 1-continued

|  |  |  |  |  |
|---|---|---|---|---|
| Example 21 | Composite solid electrolyte membrane | $1 \times 10^{-17}$ | 97 | 87 |
| Example 22 | Composite solid electrolyte membrane | $1 \times 10^{-17}$ | 97 | 89 |
| Example 23 | Composite solid electrolyte membrane | $1 \times 10^{-17}$ | 97 | 91 |
| Example 24 | Composite solid electrolyte membrane | $1 \times 10^{-17}$ | 98 | 93 |
| Example 25 | Composite solid electrolyte membrane | $1 \times 10^{-17}$ | 99 | 95 |
| Example 26 | Composite solid electrolyte membrane | $1 \times 10^{-17}$ | 99.5 | 98 |

TABLE 2

|  | Composition of positive electrode active material | Average operating potential of positive electrode active material (V) | Composition of first aqueous electrolyte (positive electrode side) | pH of first aqueous electrolyte | Composition of second aqueous electrolyte (negative electrode side) | pH of second aqueous electrolyte |
|---|---|---|---|---|---|---|
| Example 27 | $LiNi_{0.6}Co_{0.2}Mn_{0.2}O_2$ | 3.85 | 12 mol/L LiCl | 7.3 | 12 mol/L LiCl | 13.0 |
| Example 28 | $LiNi_{0.6}Co_{0.2}Mn_{0.2}O_2$ | 3.85 | 12 mol/L LiCl | 7.8 | 12 mol/L LiCl | 13.0 |
| Example 29 | $LiNi_{0.6}Co_{0.2}Mn_{0.2}O_2$ | 3.85 | 12 mol/L LiCl | 8.1 | 12 mol/L LiCl | 13.0 |
| Example 30 | $LiNi_{0.6}Co_{0.2}Mn_{0.2}O_2$ | 3.85 | 12 mol/L LiCl | 8.9 | 12 mol/L LiCl | 13.0 |
| Example 31 | $LiNi_{0.6}Co_{0.2}Mn_{0.2}O_2$ | 3.85 | 12 mol/L LiCl | 10.9 | 12 mol/L LiCl | 13.0 |
| Example 32 | $LiNi_{0.6}Co_{0.2}Mn_{0.2}O_2$ | 3.85 | 12 mol/L LiCl | 12.4 | 12 mol/L LiCl | 13.0 |
| Example 33 | $LiNi_{0.6}Co_{0.2}Mn_{0.2}O_2$ | 3.85 | 12 mol/L LiCl | 13.4 | 12 mol/L LiCl | 13.0 |
| Example 34 | $LiNi_{0.6}Co_{0.2}Mn_{0.2}O_2$ | 3.85 | 12 mol/L LiCl | 13.0 | 12 mol/L LiCl | 7.5 |
| Example 35 | $LiNi_{0.6}Co_{0.2}Mn_{0.2}O_2$ | 3.85 | 12 mol/L LiCl | 13.0 | 12 mol/L LiCl | 8.2 |
| Example 36 | $LiNi_{0.6}Co_{0.2}Mn_{0.2}O_2$ | 3.85 | 12 mol/L LiCl | 13.0 | 12 mol/L LiCl | 9.0 |
| Example 37 | $LiNi_{0.6}Co_{0.2}Mn_{0.2}O_2$ | 3.85 | 12 mol/L LiCl | 13.0 | 12 mol/L LiCl | 11.0 |
| Example 38 | $LiNi_{0.6}Co_{0.2}Mn_{0.2}O_2$ | 3.85 | 12 mol/L LiCl | 13.0 | 12 mol/L LiCl | 12.5 |
| Example 39 | $LiNi_{0.6}Co_{0.2}Mn_{0.2}O_2$ | 3.85 | 12 mol/L LiCl | 13.0 | 12 mol/L LiCl | 13.5 |
| Example 40 | $LiNi_{0.333}Co_{0.333}Mn_{0.333}O_2$ | 3.95 | 12 mol/L LiCl | 7.2 | 12 mol/L LiCl | 13.0 |
| Example 41 | $LiNi_{0.333}Co_{0.333}Mn_{0.333}O_2$ | 3.95 | 12 mol/L LiCl | 7.7 | 12 mol/L LiCl | 13.0 |
| Example 42 | $LiNi_{0.333}Co_{0.333}Mn_{0.333}O_2$ | 3.95 | 12 mol/L LiCl | 8.0 | 12 mol/L LiCl | 13.0 |
| Example 43 | $LiNi_{0.333}Co_{0.333}Mn_{0.333}O_2$ | 3.95 | 12 mol/L LiCl | 8.8 | 12 mol/L LiCl | 13.0 |
| Example 44 | $LiNi_{0.333}Co_{0.333}Mn_{0.333}O_2$ | 3.95 | 12 mol/L LiCl | 10.8 | 12 mol/L LiCl | 13.0 |
| Example 45 | $LiNi_{0.333}Co_{0.333}Mn_{0.333}O_2$ | 3.95 | 12 mol/L LiCl | 12.3 | 12 mol/L LiCl | 13.0 |
| Example 46 | $LiNi_{0.333}Co_{0.333}Mn_{0.333}O_2$ | 3.95 | 12 mol/L LiCl | 13.2 | 12 mol/L LiCl | 13.0 |
| Example 47 | $LiNi_{0.333}Co_{0.333}Mn_{0.333}O_2$ | 3.95 | 12 mol/L LiCl | 13.0 | 12 mol/L LiCl | 7.5 |
| Example 48 | $LiNi_{0.333}Co_{0.333}Mn_{0.333}O_2$ | 3.95 | 12 mol/L LiCl | 13.0 | 12 mol/L LiCl | 8.2 |
| Example 49 | $LiNi_{0.333}Co_{0.333}Mn_{0.333}O_2$ | 3.95 | 12 mol/L LiCl | 13.0 | 12 mol/L LiCl | 9.0 |
| Example 50 | $LiNi_{0.333}Co_{0.333}Mn_{0.333}O_2$ | 3.95 | 12 mol/L LiCl | 13.0 | 12 mol/L LiCl | 11.0 |
| Example 51 | $LiNi_{0.333}Co_{0.333}Mn_{0.333}O_2$ | 3.95 | 12 mol/L LiCl | 13.0 | 12 mol/L LiCl | 12.5 |
| Example 52 | $LiNi_{0.333}Co_{0.333}Mn_{0.333}O_2$ | 3.95 | 12 mol/L LiCl | 13.0 | 12 mol/L LiCl | 13.5 |

|  | Type or composition of separator | Permeability coefficient of separator (m$^2$) | charge-and-discharge efficiency after 20 cycles (%) | discharge capacity retention rate after 100 cycles (%) |
|---|---|---|---|---|
| Example 27 | Composite solid electrolyte membrane | $1 \times 10^{-17}$ | 96 | 72 |
| Example 28 | Composite solid electrolyte membrane | $1 \times 10^{-17}$ | 96 | 75 |
| Example 29 | Composite solid electrolyte membrane | $1 \times 10^{-17}$ | 96 | 77 |
| Example 30 | Composite solid electrolyte membrane | $1 \times 10^{-17}$ | 97 | 82 |
| Example 31 | Composite solid electrolyte membrane | $1 \times 10^{-17}$ | 97 | 87 |
| Example 32 | Composite solid electrolyte membrane | $1 \times 10^{-17}$ | 98 | 92 |
| Example 33 | Composite solid electrolyte membrane | $1 \times 10^{-17}$ | 99 | 97 |
| Example 34 | Composite solid electrolyte membrane | $1 \times 10^{-17}$ | 96 | 86 |
| Example 35 | Composite solid electrolyte membrane | $1 \times 10^{-17}$ | 96 | 88 |
| Example 36 | Composite solid electrolyte membrane | $1 \times 10^{-17}$ | 96 | 90 |
| Example 37 | Composite solid electrolyte membrane | $1 \times 10^{-17}$ | 97 | 92 |
| Example 38 | Composite solid electrolyte membrane | $1 \times 10^{-17}$ | 98 | 94 |
| Example 39 | Composite solid electrolyte membrane | $1 \times 10^{-17}$ | 99 | 97 |
| Example 40 | Composite solid electrolyte membrane | $1 \times 10^{-17}$ | 94 | 69 |
| Example 41 | Composite solid electrolyte membrane | $1 \times 10^{-17}$ | 94 | 72 |
| Example 42 | Composite solid electrolyte membrane | $1 \times 10^{-17}$ | 94 | 74 |
| Example 43 | Composite solid electrolyte membrane | $1 \times 10^{-17}$ | 95 | 79 |
| Example 44 | Composite solid electrolyte membrane | $1 \times 10^{-17}$ | 95 | 84 |
| Example 45 | Composite solid electrolyte membrane | $1 \times 10^{-17}$ | 96 | 89 |
| Example 46 | Composite solid electrolyte membrane | $1 \times 10^{-17}$ | 97 | 94 |
| Example 47 | Composite solid electrolyte membrane | $1 \times 10^{-17}$ | 94 | 83 |
| Example 48 | Composite solid electrolyte membrane | $1 \times 10^{-17}$ | 94 | 85 |
| Example 49 | Composite solid electrolyte membrane | $1 \times 10^{-17}$ | 94 | 87 |
| Example 50 | Composite solid electrolyte membrane | $1 \times 10^{-17}$ | 95 | 89 |
| Example 51 | Composite solid electrolyte membrane | $1 \times 10^{-17}$ | 96 | 91 |
| Example 52 | Composite solid electrolyte membrane | $1 \times 10^{-17}$ | 97 | 94 |

TABLE 3

|  | Composition of positive electrode active material | Average operating potential of positive electrode active material (V) | Composition of first aqueous electrolyte (positive electrode side) | pH of first aqueous electrolyte | Composition of second aqueous electrolyte (negative electrode side) | pH of second aqueous electrolyte |
|---|---|---|---|---|---|---|
| Example 53 | $LiNi_{0.5}Mn_{0.5}O_2$ | 3.95 | 12 mol/L LiCl | 7.4 | 12 mol/L LiCl | 13.0 |
| Example 54 | $LiNi_{0.5}Mn_{0.5}O_2$ | 3.95 | 12 mol/L LiCl | 7.9 | 12 mol/L LiCl | 13.0 |
| Example 55 | $LiNi_{0.5}Mn_{0.5}O_2$ | 3.95 | 12 mol/L LiCl | 8.2 | 12 mol/L LiCl | 13.0 |
| Example 56 | $LiNi_{0.5}Mn_{0.5}O_2$ | 3.95 | 12 mol/L LiCl | 9.0 | 12 mol/L LiCl | 13.0 |
| Example 57 | $LiNi_{0.5}Mn_{0.5}O_2$ | 3.95 | 12 mol/L LiCl | 11.0 | 12 mol/L LiCl | 13.0 |
| Example 58 | $LiNi_{0.5}Mn_{0.5}O_2$ | 3.95 | 12 mol/L LiCl | 12.5 | 12 mol/L LiCl | 13.0 |
| Example 59 | $LiNi_{0.5}Mn_{0.5}O_2$ | 3.95 | 12 mol/L LiCl | 13.5 | 12 mol/L LiCl | 13.0 |
| Example 60 | $LiNi_{0.5}Mn_{0.5}O_2$ | 3.95 | 12 mol/L LiCl | 13.0 | 12 mol/L LiCl | 7.5 |
| Example 61 | $LiNi_{0.5}Mn_{0.5}O_2$ | 3.95 | 12 mol/L LiCl | 13.0 | 12 mol/L LiCl | 8.2 |
| Example 62 | $LiNi_{0.5}Mn_{0.5}O_2$ | 3.95 | 12 mol/L LiCl | 13.0 | 12 mol/L LiCl | 9.0 |
| Example 63 | $LiNi_{0.5}Mn_{0.5}O_2$ | 3.95 | 12 mol/L LiCl | 13.0 | 12 mol/L LiCl | 11.0 |
| Example 64 | $LiNi_{0.5}Mn_{0.5}O_2$ | 3.95 | 12 mol/L LiCl | 13.0 | 12 mol/L LiCl | 12.5 |
| Example 65 | $LiNi_{0.5}Mn_{0.5}O_2$ | 3.95 | 12 mol/L LiCl | 13.0 | 12 mol/L LiCl | 13.5 |
| Example 66 | $LiNi_{0.5}Mn_{0.5}O_2$ | 3.95 | 12 mol/L LiCl | 7.4 | 12 mol/L LiCl | 13.0 |
| Example 67 | $LiNi_{0.5}Mn_{0.5}O_2$ | 3.95 | 12 mol/L LiCl | 7.9 | 12 mol/L LiCl | 13.0 |
| Example 68 | $LiNi_{0.5}Mn_{0.5}O_2$ | 3.95 | 12 mol/L LiCl | 8.2 | 12 mol/L LiCl | 13.0 |
| Example 69 | $LiNi_{0.5}Mn_{0.5}O_2$ | 3.95 | 12 mol/L LiCl | 9.0 | 12 mol/L LiCl | 13.0 |
| Example 70 | $LiNi_{0.5}Mn_{0.5}O_2$ | 3.95 | 12 mol/L LiCl | 11.0 | 12 mol/L LiCl | 13.0 |
| Example 71 | $LiNi_{0.5}Mn_{0.5}O_2$ | 3.95 | 12 mol/L LiCl | 12.5 | 12 mol/L LiCl | 13.0 |
| Example 72 | $LiNi_{0.5}Mn_{0.5}O_2$ | 3.95 | 12 mol/L LiCl | 13.5 | 12 mol/L LiCl | 13.0 |
| Example 73 | $LiNi_{0.5}Mn_{0.5}O_2$ | 3.95 | 12 mol/L LiCl | 13.0 | 12 mol/L LiCl | 7.5 |
| Example 74 | $LiNi_{0.5}Mn_{0.5}O_2$ | 3.95 | 12 mol/L LiCl | 13.0 | 12 mol/L LiCl | 8.2 |
| Example 75 | $LiNi_{0.5}Mn_{0.5}O_2$ | 3.95 | 12 mol/L LiCl | 13.0 | 12 mol/L LiCl | 9.0 |
| Example 76 | $LiNi_{0.5}Mn_{0.5}O_2$ | 3.95 | 12 mol/L LiCl | 13.0 | 12 mol/L LiCl | 11.0 |
| Example 77 | $LiNi_{0.5}Mn_{0.5}O_2$ | 3.95 | 12 mol/L LiCl | 13.0 | 12 mol/L LiCl | 12.5 |
| Example 78 | $LiNi_{0.5}Mn_{0.5}O_2$ | 3.95 | 12 mol/L LiCl | 13.0 | 12 mol/L LiCl | 13.5 |

|  | Type or composition of separator | Permeability coefficient of separator ($m^2$) | charge-and-discharge efficiency after 20 cycles (%) | discharge capacity retention rate after 100 cycles (%) |
|---|---|---|---|---|
| Example 53 | Composite solid electrolyte membrane | $1 \times 10^{-17}$ | 95 | 70 |
| Example 54 | Composite solid electrolyte membrane | $1 \times 10^{-17}$ | 95 | 73 |
| Example 55 | Composite solid electrolyte membrane | $1 \times 10^{-17}$ | 95 | 75 |
| Example 56 | Composite solid electrolyte membrane | $1 \times 10^{-17}$ | 96 | 80 |
| Example 57 | Composite solid electrolyte membrane | $1 \times 10^{-17}$ | 96 | 85 |
| Example 58 | Composite solid electrolyte membrane | $1 \times 10^{-17}$ | 97 | 90 |
| Example 59 | Composite solid electrolyte membrane | $1 \times 10^{-17}$ | 98 | 95 |
| Example 60 | Composite solid electrolyte membrane | $1 \times 10^{-17}$ | 95 | 84 |
| Example 61 | Composite solid electrolyte membrane | $1 \times 10^{-17}$ | 95 | 86 |
| Example 62 | Composite solid electrolyte membrane | $1 \times 10^{-17}$ | 95 | 88 |
| Example 63 | Composite solid electrolyte membrane | $1 \times 10^{-17}$ | 96 | 90 |
| Example 64 | Composite solid electrolyte membrane | $1 \times 10^{-17}$ | 97 | 92 |
| Example 65 | Composite solid electrolyte membrane | $1 \times 10^{-17}$ | 98 | 95 |
| Example 66 | Composite solid electrolyte membrane | $1 \times 10^{-17}$ | 95 | 70 |
| Example 67 | Composite solid electrolyte membrane | $1 \times 10^{-17}$ | 95 | 73 |
| Example 68 | Composite solid electrolyte membrane | $1 \times 10^{-17}$ | 95 | 75 |
| Example 69 | Composite solid electrolyte membrane | $1 \times 10^{-17}$ | 96 | 80 |
| Example 70 | Composite solid electrolyte membrane | $1 \times 10^{-17}$ | 96 | 85 |
| Example 71 | Composite solid electrolyte membrane | $1 \times 10^{-17}$ | 97 | 90 |
| Example 72 | Composite solid electrolyte membrane | $1 \times 10^{-17}$ | 98 | 95 |
| Example 73 | Composite solid electrolyte membrane | $1 \times 10^{-17}$ | 95 | 84 |
| Example 74 | Composite solid electrolyte membrane | $1 \times 10^{-17}$ | 95 | 86 |
| Example 75 | Composite solid electrolyte membrane | $1 \times 10^{-17}$ | 95 | 88 |
| Example 76 | Composite solid electrolyte membrane | $1 \times 10^{-17}$ | 96 | 90 |
| Example 77 | Composite solid electrolyte membrane | $1 \times 10^{-17}$ | 97 | 92 |
| Example 78 | Composite solid electrolyte membrane | $1 \times 10^{-17}$ | 98 | 95 |

TABLE 4

|  | Composition of positive electrode active material | Average operating potential of positive electrode active material (V) | Composition of first aqueous electrolyte (positive electrode side) | pH of first aqueous electrolyte | Composition of second aqueous electrolyte (negative electrode side) | pH of second aqueous electrolyte |
|---|---|---|---|---|---|---|
| Example 79 | $LiFe(PO4)_3$ | 3.5 | 12 mol/L LiCl | 7.8 | 12 mol/L LiCl | 13.0 |
| Example 80 | $LiFe(PO4)_3$ | 3.5 | 12 mol/L LiCl | 8.6 | 12 mol/L LiCl | 13.0 |

TABLE 4-continued

| | | | | | | |
|---|---|---|---|---|---|---|
| Example 81 | LiFe(PO4)$_3$ | 3.5 | 12 mol/L LiCl | 9.4 | 12 mol/L LiCl | 13.0 |
| Example 82 | LiFe(PO4)$_3$ | 3.5 | 12 mol/L LiCl | 11.4 | 12 mol/L LiCl | 13.0 |
| Example 83 | LiFe(PO4)$_3$ | 3.5 | 12 mol/L LiCl | 12.9 | 12 mol/L LiCl | 13.0 |
| Example 84 | LiFe(PO4)$_3$ | 3.5 | 12 mol/L LiCl | 13.9 | 12 mol/L LiCl | 13.0 |
| Example 85 | LiFe(PO4)$_3$ | 3.5 | 12 mol/L LiCl | 13.0 | 12 mol/L LiCl | 7.4 |
| Example 86 | LiFe(PO4)$_3$ | 3.5 | 12 mol/L LiCl | 13.0 | 12 mol/L LiCl | 8.2 |
| Example 87 | LiFe(PO4)$_3$ | 3.5 | 12 mol/L LiCl | 13.0 | 12 mol/L LiCl | 9.0 |
| Example 88 | LiFe(PO4)$_3$ | 3.5 | 12 mol/L LiCl | 13.0 | 12 mol/L LiCl | 11.0 |
| Example 89 | LiFe(PO4)$_3$ | 3.5 | 12 mol/L LiCl | 13.0 | 12 mol/L LiCl | 12.5 |
| Example 90 | LiFe(PO4)$_3$ | 3.5 | 12 mol/L LiCl | 13.0 | 12 mol/L LiCl | 13.5 |
| Example 91 | LiNi$_{0.5}$Co$_{0.2}$Mn$_{0.3}$O$_2$ | 3.9 | 12 mol/L LiCl | 13.0 | 12 mol/L LiCl | 13.0 |
| Example 92 | LiFe(PO4)$_3$ | 3.5 | 12 mol/L LiCl | 13.0 | 12 mol/L LiCl | 13.0 |
| Example 93 | LiNi$_{0.5}$Co$_{0.2}$Mn$_{0.3}$O$_2$ | 3.9 | 12 mol/L LiCl | 13.0 | 12 mol/L LiCl | 13.0 |
| Example 94 | LiFe(PO4)$_3$ | 3.5 | 12 mol/L LiCl | 13.0 | 12 mol/L LiCl | 13.0 |
| Example 95 | LiNi$_{0.5}$Co$_{0.2}$Mn$_{0.3}$O$_2$ | 3.9 | 12 mol/L LiCl | 13.0 | 12 mol/L LiCl | 13.0 |
| Example 96 | LiFe(PO4)$_3$ | 3.5 | 12 mol/L LiCl | 13.0 | 12 mol/L LiCl | 13.0 |
| Example 97 | LiNi$_{0.5}$Co$_{0.2}$Mn$_{0.3}$O$_2$ | 3.9 | 12 mol/L LiCl | 13.0 | 12 mol/L LiCl | 13.0 |
| Example 98 | LiFe(PO4)$_3$ | 3.5 | 12 mol/L LiCl | 13.0 | 12 mol/L LiCl | 13.0 |
| Example 99 | LiNi$_{0.5}$Co$_{0.2}$Mn$_{0.3}$O$_2$ | 3.9 | 12 mol/L LiCl | 13.0 | 12 mol/L LiCl | 13.0 |
| Example 100 | LiFe(PO4)$_3$ | 3.5 | 12 mol/L LiCl | 13.0 | 12 mol/L LiCl | 13.0 |
| Example 101 | LiNi$_{0.5}$Co$_{0.2}$Mn$_{0.3}$O$_2$ | 3.9 | 12 mol/L LiCl | 13.0 | 12 mol/L LiCl | 13.0 |
| Example 102 | LiFe(PO4)$_3$ | 3.5 | 12 mol/L LiCl | 13.0 | 12 mol/L LiCl | 13.0 |
| Example 103 | LiNi$_{0.5}$Co$_{0.2}$Mn$_{0.3}$O$_2$ | 3.9 | 12 mol/L LiCl | 13.0 | 12 mol/L LiCl | 13.0 |
| Example 104 | LiFe(PO4)$_3$ | 3.5 | 12 mol/L LiCl | 13.0 | 12 mol/L LiCl | 13.0 |

| | Type or composition of separator | Permeability coefficient of separator (m$^2$) | charge-and-discharge efficiency after 20 cycles (%) | discharge capacity retention rate after 100 cycles (%) |
|---|---|---|---|---|
| Example 79 | Composite solid electrolyte membrane | $1 \times 10^{-17}$ | 98 | 81 |
| Example 80 | Composite solid electrolyte membrane | $1 \times 10^{-17}$ | 98 | 83 |
| Example 81 | Composite solid electrolyte membrane | $1 \times 10^{-17}$ | 99 | 88 |
| Example 82 | Composite solid electrolyte membrane | $1 \times 10^{-17}$ | 99 | 93 |
| Example 83 | Composite solid electrolyte membrane | $1 \times 10^{-17}$ | 99.5 | 98 |
| Example 84 | Composite solid electrolyte membrane | $1 \times 10^{-17}$ | 99.8 | 99 |
| Example 85 | Composite solid electrolyte membrane | $1 \times 10^{-17}$ | 98 | 92 |
| Example 86 | Composite solid electrolyte membrane | $1 \times 10^{-17}$ | 98 | 94 |
| Example 87 | Composite solid electrolyte membrane | $1 \times 10^{-17}$ | 98 | 96 |
| Example 88 | Composite solid electrolyte membrane | $1 \times 10^{-17}$ | 99 | 98 |
| Example 89 | Composite solid electrolyte membrane | $1 \times 10^{-17}$ | 99.5 | 99.5 |
| Example 90 | Composite solid electrolyte membrane | $1 \times 10^{-17}$ | 99.8 | 99.8 |
| Example 91 | Composite solid electrolyte membrane | $1 \times 10^{-16}$ | 96.5 | 89.5 |
| Example 92 | Composite solid electrolyte membrane | $1 \times 10^{-16}$ | 99.3 | 99.5 |
| Example 93 | Composite solid electrolyte membrane | $1 \times 10^{-18}$ | 97.5 | 91 |
| Example 94 | Composite solid electrolyte membrane | $1 \times 10^{-18}$ | 99.9 | 99.5 |
| Example 95 | Solid electrolyte membrane (LATP) | 0 | 95 | 75 |
| Example 96 | Solid electrolyte membrane (LATP) | 0 | 96 | 78 |
| Example 97 | Porous film | $1 \times 10^{-15}$ | 92 | 65 |
| Example 98 | Porous film | $1 \times 10^{-15}$ | 92.5 | 67 |
| Example 99 | Porous film | $1 \times 10^{-16}$ | 93 | 70 |
| Example 100 | Porous film | $1 \times 10^{-16}$ | 93.5 | 75 |
| Example 101 | Ceramic membrane (Al$_2$O$_3$) | 0 | 91 | 45 |
| Example 102 | Ceramic membrane (Al$_2$O$_3$) | 0 | 91 | 45 |
| Example 103 | Porous film | $1 \times 10^{-13}$ | 92 | 43 |
| Example 104 | Porous film | $1 \times 10^{-13}$ | 92 | 43 |

TABLE 5

| | Composition of positive electrode active material | Average operating potential of positive electrode active material (V) | Composition of first aqueous electrolyte (positive electrode side) | pH of first aqueous electrolyte | Composition of second aqueous electrolyte (negative electrode side) | pH of second aqueous electrolyte |
|---|---|---|---|---|---|---|
| Comparative Example 1 | LiNi$_{0.5}$Co$_{0.2}$Mn$_{0.3}$O$_2$ | 3.9 | 12 mol/L LiCl | 2.0 | 12 mol/L LiCl | 13.0 |
| Comparative Example 2 | LiNi$_{0.5}$Co$_{0.2}$Mn$_{0.3}$O$_2$ | 3.9 | 12 mol/L LiCl | 3.0 | 12 mol/L LiCl | 13.0 |
| Comparative Example 3 | LiCoPO4 | 4.7 | 12 mol/L LiCl | 2.0 | 12 mol/L LiCl | 13.0 |
| Comparative Example 4 | LiCoPo4 | 4.7 | 12 mol/L LiCl | 6.0 | 12 mol/L LiCl | 13.0 |
| Comparative Example 5 | LMO | 4.0 | 12 mol/L LiCl | 13.0 | 12 mol/L LiCl | 13.0 |
| Comparative Example 6 | LiNi$_{0.5}$Mn$_{1.5}$O$_4$ (Rock salt type) | 4.1 | 12 mol/L LiCl | 13.0 | 12 mol/L LiCl | 13.0 |

TABLE 5-continued

| | | | | | | |
|---|---|---|---|---|---|---|
| Comparative Example 7 | LiNi$_{0.5}$Mn$_{1.5}$O$_4$ (Spinel type) | 4.6 | 12 mol/L LiCl | 13.0 | 12 mol/L LiCl | 13.0 |
| Comparative Example 8 | LiCoO2 | 4.2 | 12 mol/L LiCl | 13.0 | 12 mol/L LiCl | 13.0 |

| | Type or composition of separator | Permeability coefficient of separator (m$^2$) | charge-and-discharge efficiency after 20 cycles (%) | discharge capacity retention rate after 100 cycles (%) |
|---|---|---|---|---|
| Comparative Example 1 | Composite solid electrolyte membrane | 1 × 10$^{-17}$ | 90 | 28 |
| Comparative Example 2 | Composite solid electrolyte membrane | 1 × 10$^{-17}$ | 90 | 30 |
| Comparative Example 3 | Composite solid electrolyte membrane | 1 × 10$^{-17}$ | 84 | 20 |
| Comparative Example 4 | Composite solid electrolyte membrane | 1 × 10$^{-17}$ | 84 | 25 |
| Comparative Example 5 | Composite solid electrolyte membrane | 1 × 10$^{-17}$ | 90 | 40 |
| Comparative Example 6 | Composite solid electrolyte membrane | 1 × 10$^{-17}$ | 88 | 35 |
| Comparative Example 7 | Composite solid electrolyte membrane | 1 × 10$^{-17}$ | 85 | 30 |
| Comparative Example 8 | Composite solid electrolyte membrane | 1 × 10$^{-17}$ | 89 | 32 |

As readable from Tables 1 to 5, Examples 1 to 104, each of which has the pH of the first aqueous electrolyte exceeding 7 and contains, as the positive electrode active material, the lithium-containing compound that exhibits an average operating potential of less than 4.0 V based on lithium metal, were excellent in both of the charge-and-discharge efficiency after 20 cycles and the discharge capacity retention rate after 100 cycles.

Comparative examples 1 and 2, in each of which the pH of the first aqueous electrolyte is 7 or less, was relatively excellent in charge-and-discharge efficiency, but was poor in discharge capacity retention rate. This is considered to be because the proton exchange caused by the repetition of the charge-and-discharge cycle gradually occurred in the positive electrode that is in contact with the first aqueous electrolyte having a high proton concentration.

Each of Comparative examples 3 and 4 is an example in which the pH of the first aqueous electrolyte is 7 or less and the positive electrode active material with an average operating potential of 4.7 V (vs. Li/Li$^+$) is used. In each of these examples, it is considered that the charge-and-discharge efficiency is poor since the generation of oxygen in the positive electrode increases as well as the discharge capacity retention rate decreases due to the proton exchange.

As shown in each of Comparative examples 5 to 8, even if the composition of the positive electrode active material is changed, when the average operating potential is 4.0 V (vs. Li/Li$^+$) or more, only poor cycle life characteristics are achieved even if the pH of the first aqueous electrolyte exceeds 7. Under basic conditions, when the positive electrode active material with an average operating voltage of 4.0 V (vs. Li/Li$^+$) or more is used, the decrease of the discharge capacity due to the proton exchange can be suppressed. That is, relatively excellent charge-and-discharge efficiency is achieved. Meanwhile, it is considered that, under the basic conditions, only poor discharge capacity retention rate is achieved since the oxidation reaction of water (generation of O$_2$) progresses more advantageously than Li insertion-and-extraction reactions with the positive electrode active material.

When the pH of the first aqueous electrolyte increases, the discharge capacity retention rate is improved while keeping high charge-and-discharge efficiency. This fact is readable, for example, from Examples 1 to 7, 14 to 20, 27 to 33, 40 to 46, 53 to 59, 66 to 72, and 79 to 84. The pH of the first aqueous electrolyte is preferably 8.0 or more, more preferably 13.0 or more.

Further, higher pH of the second aqueous electrolyte on the negative electrode side brings an effect that the generation of hydrogen is suppressed as mentioned above. This fact is readable, for example, from Examples 8 to 13, 21 to 26, 34 to 39, 47 to 52, 60 to 65, 73 to 78, and 85 to 90. These examples exhibit that superior cycle life characteristics are achieved as the pH of the second aqueous electrolyte is higher.

As shown in Examples 91 to 94, excellent cycle life characteristics can be achieved even if the permeability coefficient of the composite solid electrolyte membrane is changed. Further, when the LATP solid electrolyte membrane with lithium ion conductivity at 25° C. of 1×10$^{-10}$ S/cm or more, excellent cycle life characteristics can be achieved (Examples 95 and 96) as in the other examples. Moreover, in each of Examples 97 to 100, 103 and 104, each of which uses only the porous film as the separator, superior discharge capacity retention rate is exhibited as the permeability coefficient is lower. This is considered to be because the electrolysis reaction of water can be suppressed since the mixture of the first aqueous electrolyte and the second aqueous electrolyte can be prevented as a permeability coefficient is lower, and the local (the very vicinity of the positive electrode) oxidation of the first aqueous electrolyte in the initial period of the cycle and the basification of the local (the very vicinity of the negative electrode) of the second aqueous electrolyte therein can be held.

Each of Examples 101 and 102 is an example of using, as the separator, a ceramic membrane containing alumina. The lithium ion conductivity of alumina is 0 at 25° C., and in addition, the permeability coefficient of this ceramic membrane is 0; however, excellent charge-and-discharge efficiency and discharge capacity retention rate are exhibited.

In accordance with at least one of the embodiments and the examples, which are mentioned above, a secondary battery is provided. The secondary battery includes: a positive electrode containing a positive electrode active material;

a negative electrode; a separator arranged between the positive electrode and the negative electrode; and a first aqueous electrolyte held in at least the positive electrode. pH of the first aqueous electrolyte is more than 7. The positive electrode active material contains a lithium-containing compound that exhibits an average operating potential of less than 4.0 V based on lithium metal. In the secondary battery, the proton exchange for the positive electrode active material is suppressed, and in addition, the generation of oxygen in the positive electrodes is also suppressed. Therefore, excellent cycle life characteristics can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
    a positive electrode that comprises a positive electrode active material;
    a negative electrode;
    a separator disposed between the positive electrode and the negative electrode;
    a first aqueous electrolyte held in at least the positive electrode; and
    a second aqueous electrolyte held in at least the negative electrode,
    wherein a pH of the first aqueous electrolyte exceeds 7,
    a pH of the second aqueous electrolyte is 8.0 or more, and
    the positive electrode active material comprises a lithium-containing compound that exhibits an average operating potential of less than 4.0 V based on lithium metal.

2. The secondary battery according to claim 1, wherein the pH of the first aqueous electrolyte is 8.0 or more.

3. The secondary battery according to claim 1, wherein the pH of the first aqueous electrolyte is 13.0 or more.

4. The secondary battery according to claim 1, wherein the lithium-containing compound is at least one selected from the group consisting of a lithium nickel composite oxide, a lithium cobalt composite oxide, a lithium nickel cobalt composite oxide, a lithium manganese cobalt composite oxide, a lithium phosphorus oxide having an olivine structure, a lithium nickel cobalt manganese composite oxide, and a lithium vanadium phosphorus oxide.

5. The secondary battery according to claim 1, wherein the separator comprises a solid electrolyte membrane comprising a solid electrolyte that has lithium ion conductivity of $1 \times 10^{-10}$ S/cm or more at 25° C. and a porous sheet in which a permeability coefficient ranges from $1 \times 10^{-19}$ m$^2$ or more to less than $1 \times 10^{-15}$ m$^2$.

6. The secondary battery according to claim 5, wherein the separator comprises a composite solid electrolyte membrane in which the solid electrolyte membrane is stacked on at least one main surface of the porous sheet.

7. The secondary battery according to claim 6, wherein a permeability coefficient of the composite solid electrolyte membrane ranges from $1 \times 10^{-19}$ m$^2$ or more to less than $1 \times 10^{-15}$ m$^2$.

8. The secondary battery according to claim 1, wherein the separator comprises a solid electrolyte membrane comprising a solid electrolyte that has lithium ion conductivity of $1 \times 10^{-10}$ S/cm or more at 25° C.

9. The secondary battery according to claim 1, wherein the separator comprises a porous sheet in which a permeability coefficient ranges from $1 \times 10^{-19}$ m$^2$ or more to less than $1 \times 10^{-15}$ m$^2$.

10. The secondary battery according to claim 1, wherein the pH of the second aqueous electrolyte is 13.0 or more.

11. A battery pack comprising the secondary battery according to claim 1.

12. The battery pack according to claim 11, further comprising:
    an external power distribution terminal; and
    a protective circuit.

13. The battery pack according to claim 11, comprising a plurality of the secondary battery, wherein the secondary batteries are electrically connected in series, in parallel, or in a combination of in series and in parallel.

14. A vehicle comprising the battery pack according to claim 13.

15. The vehicle according to claim 14, which comprises a mechanism configured to convert kinetic energy of the vehicle into regenerative energy.

16. The secondary battery according to claim 1, wherein the first aqueous electrolyte comprises lithium ions, and a concentration of lithium ions in the first aqueous electrolyte is 6 mol/L or more.

* * * * *